(12) United States Patent
Kochelek

(10) Patent No.: US 10,486,005 B2
(45) Date of Patent: Nov. 26, 2019

(54) INHIBITING OXYGEN CORROSION IN WATER SUPPLY SYSTEMS, PIPING NETWORKS AND WATER-BASED FIRE SPRINKLER SYSTEMS

(71) Applicant: Engineered Corrosion Solutions, LLC, St. Louis, MO (US)

(72) Inventor: Jeffrey T. Kochelek, Creve Coeur, MO (US)

(73) Assignee: Engineered Corrosion Solutions, LLC, St. Louis, MO (US)

( * ) Notice: Subject to any disclaimer, the term of this patent is extended or adjusted under 35 U.S.C. 154(b) by 301 days.

(21) Appl. No.: 15/310,538

(22) PCT Filed: May 13, 2015

(86) PCT No.: PCT/US2015/030606
§ 371 (c)(1),
(2) Date: Nov. 11, 2016

(87) PCT Pub. No.: WO2015/175684
PCT Pub. Date: Nov. 19, 2015

(65) Prior Publication Data
US 2017/0072237 A1    Mar. 16, 2017

Related U.S. Application Data

(60) Provisional application No. 61/992,590, filed on May 13, 2014.

(51) Int. Cl.
*A62C 35/62* (2006.01)
*F16L 58/00* (2006.01)
*A62C 35/68* (2006.01)

(52) U.S. Cl.
CPC .............. *A62C 35/62* (2013.01); *A62C 35/68* (2013.01); *F16L 58/00* (2013.01)

(58) Field of Classification Search
CPC ......... A62C 35/62; A62C 65/68; A62C 35/68; F16L 58/00
(Continued)

(56) References Cited

U.S. PATENT DOCUMENTS 6,415,870 B1 *  7/2002  Matsuoka ............. A62C 35/60
                                                        169/16
6,960,321 B1 * 11/2005  Ludwig ..................... A61L 2/07
                                                        169/37
(Continued)

FOREIGN PATENT DOCUMENTS

| CN | 203458722 U | 3/2014 |
| JP | 2008035949 A | 2/2008 |
| JP | 2008073227 A | 4/2008 |

*Primary Examiner* — Steven J Ganey
(74) *Attorney, Agent, or Firm* — Husch Blackwell LLP

(57) ABSTRACT

A method of inhibiting oxygen in ambient air from entering a water supply system having at least one ingress point at which a fluid can enter the water supply system includes supplying an inert gas to the at least one ingress point of the water supply system. The inert gas enters the water supply system at the at least one ingress point and substantially inhibits ambient air including oxygen from entering the water supply system at the at least one ingress point to substantially inhibit oxygen corrosion in the water supply system. Example pump assemblies for coupling to water supply systems, piping networks, and water-based fire sprinkler systems for inhibiting ambient air, including the oxygen it may contain, from entering the systems are also disclosed.

15 Claims, 26 Drawing Sheets

(58) Field of Classification Search
USPC .......................................... 169/13, 16, 37, 54
See application file for complete search history.

(56) References Cited

U.S. PATENT DOCUMENTS

| | | |
|---|---|---|
| 2010/0263882 A1* | 10/2010 | Bodemann ............. A62C 35/62 169/17 |
| 2011/0226495 A1 | 9/2011 | Burkhart et al. |
| 2012/0204963 A1 | 8/2012 | McHugh et al. |

* cited by examiner

INHIBITING OXYGEN CORROSION IN WATER SUPPLY SYSTEMS, PIPING NETWORKS AND WATER-BASED FIRE SPRINKLER SYSTEMS

CROSS-REFERENCE TO RELATED APPLICATION

This application claims the benefit of U.S. Provisional Application No. 61/992,590, filed May 13, 2014. The entire disclosure of the above application is incorporated herein by reference.

BACKGROUND

This section provides background information related to the present disclosure which is not necessarily prior art.

Water pumps are commonly used in a wide variety of applications to move water through piping networks and/or increase the pressure of water in the piping networks. For example, a water-based fire sprinkler system may include a water pump for supplying high pressure water to sprinklers via a piping network during a fire event, particularly if the fire sprinkler system is installed in a multi-story building where water must be supplied to sprinklers at high elevations.

SUMMARY

This section provides a general summary of the disclosure, and is not a comprehensive disclosure of its full scope or all of its features.

According to one aspect of the present disclosure, a method of inhibiting oxygen corrosion in a water supply system having a piping network and a water pump coupled to the piping network is disclosed. The method includes supplying inert gas to the piping network on an outlet side of the water pump.

According to another aspect of the present disclosure, a water-based fire sprinkler system includes one or more sprinklers, a water pump, a piping network coupling the water pump to the one or more sprinklers, and a vent configured to vent gas but not water. The piping network includes a riser and the vent is coupled to the riser.

According to a further aspect of the present disclosure, a water supply system includes a piping network, a water pump coupled to the piping network, a check valve coupled to the piping network, and a vent configured to vent gas but not water. The vent is coupled to the piping network between the water pump and the check valve.

According to another aspect of the present disclosure, a vent vent assembly for venting gas from the water supply system of a water-based fire sprinkler system includes a first vent configured to vent but not water, and a second vent configured to vent air but not water. The first vent and the second vent are coupled in series with one another.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
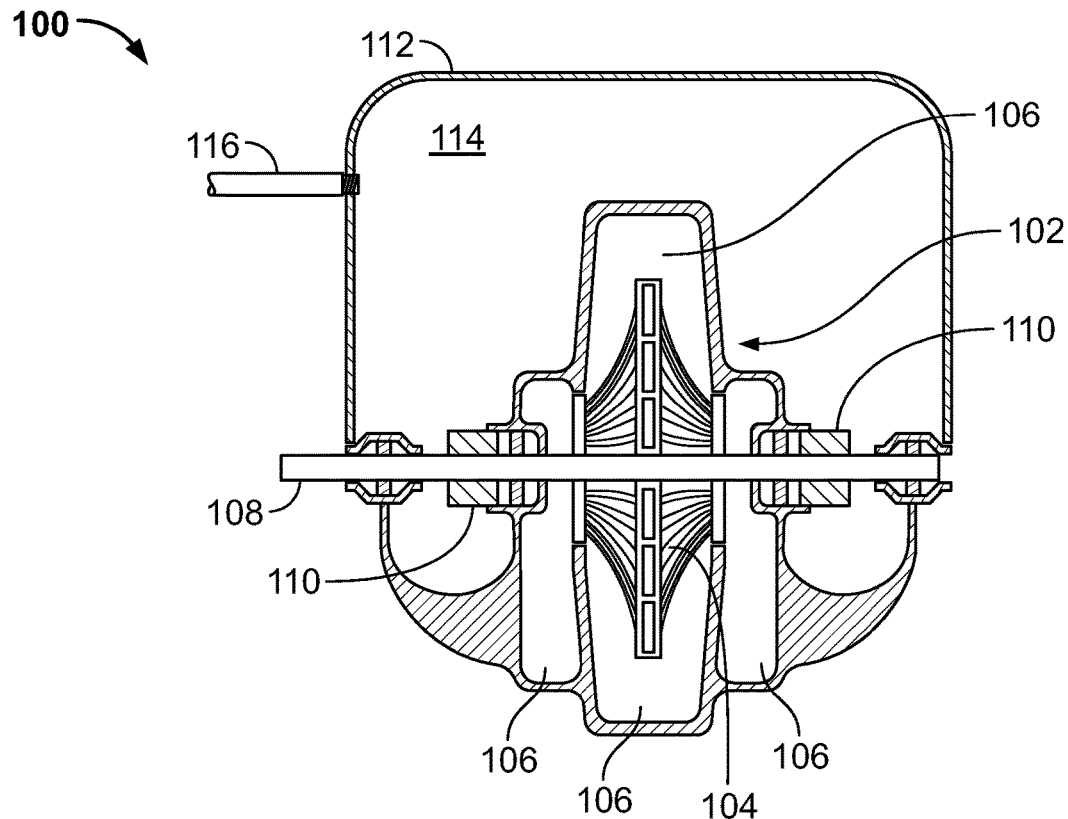
FIG. 1 is a sectional view of a pump assembly having one or more ingress points according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Corrosion within water-based systems (e.g., water-based fire sprinkler systems) can be a significant cause of leaks, component failures and system failures, each of which can require expensive repairs. Chemical reactions between oxygen, carbon dioxide, etc. and ferrous and cuprous metal pipes may be a significant cause of corrosion within water-based systems. As such, it is desirable to inhibit the introduction of oxygen, carbon dioxide, etc. into water-based systems in order to prevent such corrosion. For the same reasons, it is also desirable to inhibit the introduction of ambient air because ambient air typically contains approximately 21% oxygen gas and 0.04% carbon dioxide.

Many water supply systems including, for example, the piping network supplying water to a water-based fire sprinkler system, include one or more ingress points at which fluids such as air, water, etc. can under certain conditions enter the water supply system. Some example ingress points include leaky pipe joints, gas release valves, and water pumps having seals or other components that allow fluids to enter the water supply system.

Points of ingress may permit a substantially continuous flow of ambient air, including oxygen, into water supply systems. Alternately, points of ingress may permit the flow of ambient air, including oxygen, into water supply systems when particular system components are put into service, when particular maintenance tasks are performed on the systems, when particular conditions within the systems occur, intermittently, and/or independently of the operation or maintenance of the systems. It is desirable, therefore, to inhibit the introduction of ambient air, and oxygen it may contain, into the water supply systems through such points of ingress in order to prevent the occurrence of corrosion within the water supply systems, piping networks coupled to or comprised within water supply systems, and/or water-based fire sprinkler systems including water supply systems.

Oxygen in ambient air is one example of a fluid that may enter a water supply system at an ingress point. The oxygen may enter the water supply system with other gases (i.e., oxygen gas as a component of ambient air) and/or as oxygen dissolved in water. After entering a water supply system, oxygen can cause significant corrosion of the piping network (as explained above), which typically includes galvanized steel or black steel piping. In fact, a dissolved oxygen concentration in water of only 50 parts per billion may still result in significant oxygen corrosion within a piping network.

To address these and other issues, the present disclosure provides a method of inhibiting oxygen in ambient air from entering a water supply system having at least one ingress point at which a fluid can enter the water supply system. The method includes supplying an inert gas to the at least one ingress point of the water supply system. The inert gas enters the water supply system at the at least one ingress point and substantially inhibits ambient air including oxygen from entering the water supply system at the at least one ingress point to substantially inhibit oxygen corrosion in the water supply system.

The inert gas may be supplied directly to the ingress point(s) or to an area adjacent the ingress point(s). For example, a water supply system may include a gas release valve that is intended to allow gas to exit the system, but may also allow gas to enter the system. In that event, the inert gas may be supplied to an area adjacent (e.g., surrounding) the gas release valve. Therefore, when the gas release valve allows gas to enter the system, substantially all of the gas that enters will be the inert gas from the surrounding area, rather than ambient air, which may include oxygen gas. In some example embodiments, the area adjacent the gas release valve (or other ingress point) is defined by a housing that may enclose the gas release valve. The inert gas may be supplied to the ingress point(s) intermittently (e.g., as needed), continuously, etc.

The inert gas may be any gas that does not react with components of the water supply system, including components comprising steel, under normal conditions. For example, the inert gas may be purified nitrogen (i.e., having a nitrogen concentration greater than air, and preferably in the range of about 80%-99.9% nitrogen), purified argon, a noble gas, etc.

The water supply system may include a water pump defining one or more ingress points. For example, the water pump may include a seal that permits, at least to a limited extent, fluid to enter the water supply system. In that case, the method of inhibiting oxygen in ambient air from entering the water supply system may include supplying the inert gas to the seal. As a result, when the seal permits fluid to enter the water pump, substantially all of the fluid that enters will be the inert gas rather than ambient air, which may include oxygen. In this manner, oxygen corrosion in the water supply system can be substantially inhibited.

When operated, e.g., for testing, as a result of a fire event, etc., a water pump may create a vacuum relative to the atmospheric pressure of the ambient air. Such a vacuum may cause a volume of ambient air to enter the water supply system through points of ingress into the system in and around the water pump. As a result, ambient air, including oxygen it may contain, may enter the system and may cause corrosion as explained above. Such a vacuum may be created during the operation of a water pump, after the water pump has ceased to operate, etc.

Accordingly, the inert gas may be supplied to the ingress point(s) when the water pump is activated (i.e., when the water pump is operating and pumping water) and, in some cases, only when the water pump is activated. Additionally, or alternatively, the inert gas may be supplied to the ingress point(s) before and/or after the water pump is activated and/or after the water pump is deactivated. For example, the inert gas may be supplied a defined period of time before the water pump is activated and/or a defined period of time after the water pump is deactivated. The duration of such time period(s) can be selected as desired for any given implementation. In some embodiments, the duration of the time period(s) are in the range of two to four minutes. Alternatively, longer or shorter durations may be employed. Supplying the inert gas before the water pump is activated and after the water pump is deactivated may be particularly useful when testing the water supply system.

Additionally, or alternatively, the water supply system may include a piping network having at least two pipes coupled to one another via a pipe joint, with the pipe joint defining one or more ingress points. For example, the pipe joint may include a leaky weld or mechanical fitting that permits, at least to a limited extent, fluid to enter the water supply system. In that case, the method of inhibiting oxygen in ambient air from entering the water supply system may include supplying the inert gas to the pipe joint. As a result, when the pipe joint permits fluid to enter the water supply system, substantially all of the fluid that enters will be the inert gas rather than ambient air, which may include oxygen.

The methods disclosed herein may be employed in a wide variety of water supply systems, including water supply systems having water pumps, gas release valves and/or pipe joints, and water supply systems for water-based fire sprinkler systems. Some example pump assemblies, piping networks and sprinkler systems are described below with reference to FIGS. 1-11. It should be understood, however, that the teachings of this disclosure are not limited to the particular examples shown in FIGS. 1-11, and can be applied to a wide variety of other pumps, networks and systems.

A pump assembly for a water supply system according to one example embodiment of the present disclosure is illustrated in FIG. 1 and indicated generally by reference number 100. As shown in FIG. 1, the pump assembly 100 includes a water pump 102 having an impeller 104 positioned within a pump chamber 106. The pump chamber 106 has an inlet (not shown) for receiving water (e.g., municipal water) and an outlet (not shown) for supplying water at an increased pressure and/or flow rate to a piping network when the water pump 102 is coupled to the piping network.

The water pump 102 further includes a shaft 108 for driving rotation of the impeller 104, and one or more seals 110 for inhibiting water from escaping the pump chamber 106 (except through the pump chamber outlet).

Each seal 110 may define an ingress point at which a fluid can enter the water pump 102. For example, if the seals 110 are exposed to ambient air, the seals 110 may permit ambient air, including oxygen it may contain, to pass between the seals 110 and the shaft 108 and enter the pump chamber 106. The oxygen could then pass through the pump chamber outlet into the piping network and cause significant corrosion in the piping network. The water pump 102 may include other ingress point(s) at which a fluid can enter the water pump, in addition to or instead of the seals 110.

As shown in FIG. 1, the water pump assembly 100 further includes a housing 112 surrounding the seals 110 (and/or other ingress point(s)) and defining a space 114 therebetween. The housing 112 is adapted for coupling to an inert gas source, such as a nitrogen generator or storage vessel (e.g., a nitrogen cylinder), for supplying an inert gas from the inert gas source to the space 114 between the housing 112 and the water pump 102. Therefore, when the seals 110 (or other ingress point(s)) permit fluid to enter the water pump 102, substantially all of the fluid that enters will be the inert gas rather than ambient air, which may include oxygen.

The housing 112 may be adapted for coupling to an inert gas source in any suitable way. For example, the housing 112 may include an aperture through which the inert gas can be supplied to the space 114 within the housing 112. The aperture may be coupled to, e.g., a threaded or non-threaded pipe fitting. In the particular example shown in FIG. 1, the pump assembly 100 includes a gas supply line 116 for conveying the inert gas from the inert gas source to the space 114 within the housing 112.

Further, the housing 112 may substantially surround the water pump 102, as shown in FIG. 1. Alternatively, the housing 112 may surround only portion(s) of the water pump 102 that include the one or more ingress points.

Figure 2:
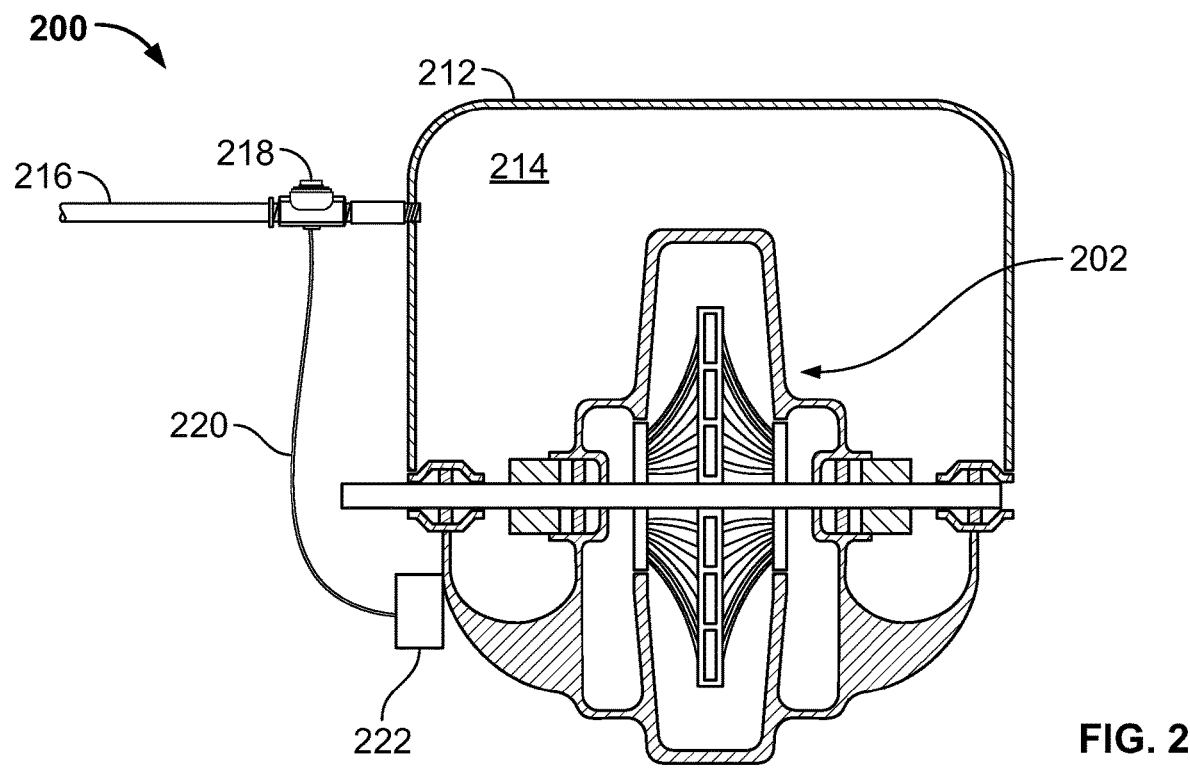
FIG. 2 is a sectional view of a pump assembly having a valve for controlling the flow of an inert gas according to another example embodiment.

FIG. 2 illustrates a pump assembly 200 according to another example embodiment. The pump assembly 200 of FIG. 2 is similar to the pump assembly 100 of FIG. 1, but includes a gas supply line 216 having an electromechanically operated valve 218 (e.g., a solenoid valve). The valve 218 is coupled via an electrical cable 220 to an electrical junction box 222 for the water pump 202. When the water pump 202 is activated (i.e., turned on) and pumping water, the valve 218 may be automatically opened to allow the inert gas to flow into the space 214 within the housing 212. When the water pump 202 is deactivated (i.e., turned off), the valve 218 may be automatically closed to stop the flow of inert gas. Thus, the valve 218 may be open only when the water pump 202 is activated.

Alternatively, the pump assembly 200 may include a manually operated valve instead of or in addition to the electromechanically operated valve 218 explained above.

Figure 3:
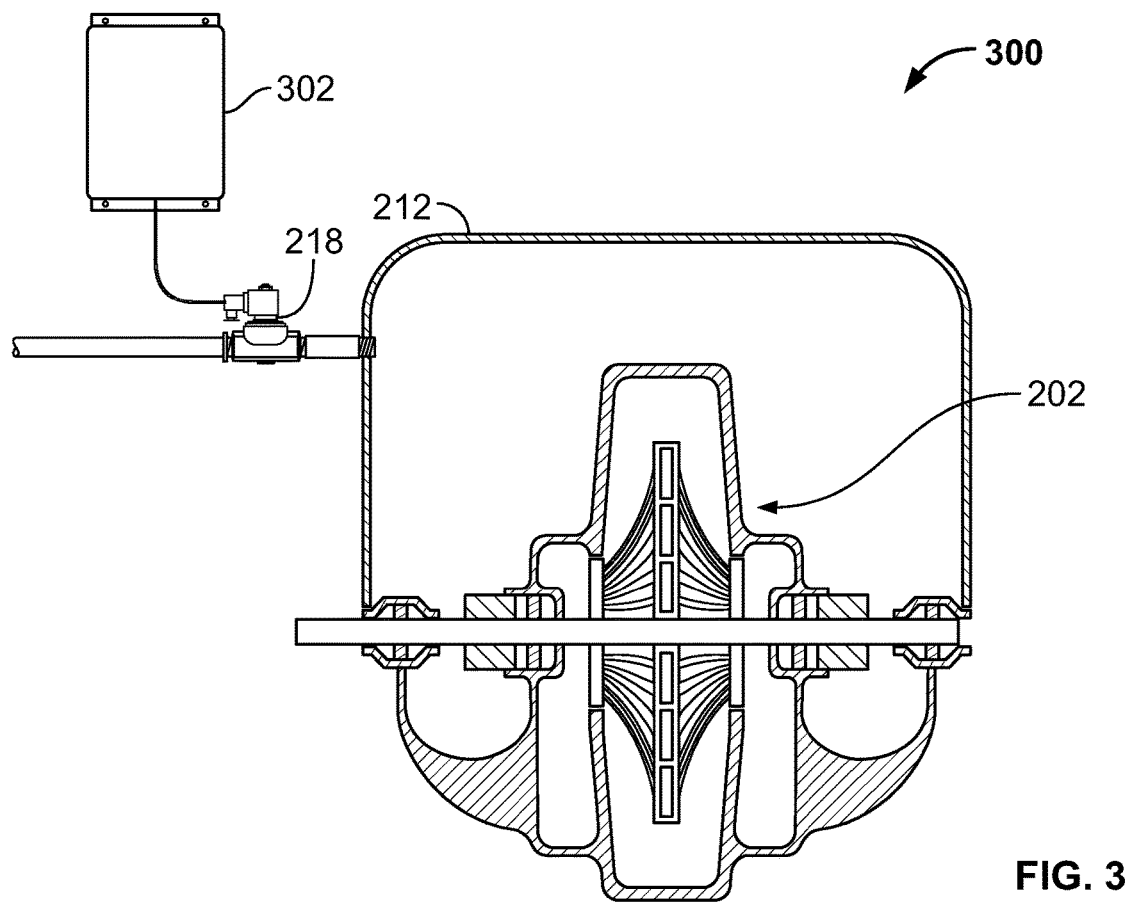
FIG. 3 is a sectional view of a pump assembly having a valve coupled to a controller according to yet another example embodiment.

FIG. 3 illustrates a pump assembly 300 according to another example embodiment. The pump assembly 300 of FIG. 3 is similar to the pump assembly 200 of FIG. 2. However, in the example of FIG. 3, the valve 218 is coupled to a controller 302, rather than the electrical junction box 222. Thus, the valve 218 is opened or closed by the controller 302. The controller 302 may be configured (e.g., via circuit components and/or a processor) to open the valve 218 when the water pump 202 is activated and, optionally, only when the water pump 202 is activated. Additionally, or alternatively, the controller 302 may be configured to open the valve 218 a defined period of time before the water pump 202 is activated and/or close the valve 218 a defined period of time after the water pump 202 is deactivated.

The controller 302 may also be configured to open and close the valve 218 based on, e.g., a sensed oxygen or nitrogen concentration within the housing 212. To this end, the pump assembly 300 may further include an oxygen or nitrogen sensor within the housing 212.

Figure 4:
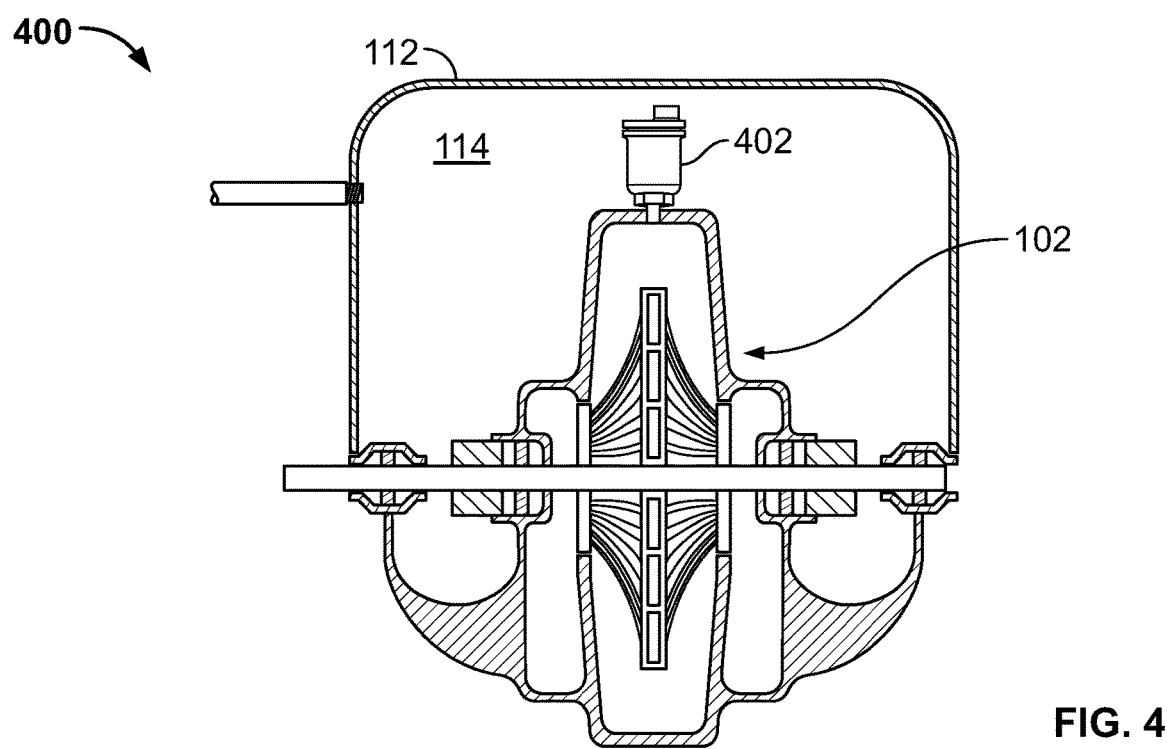
FIG. 4 is a sectional view of a pump assembly including a water pump having a gas release valve according to another example embodiment.

FIG. 4 illustrates a pump assembly 400 according to yet another example embodiment. The pump assembly 400 of FIG. 4 is similar to the pump assembly 100 of FIG. 1, but includes a gas release valve 402 coupled to the water pump 102. The gas release valve 402 is preferably adapted to release gas but not water from the water pump 102 (e.g., to prevent pump cavitation), and may include a float mechanism that automatically closes the valve 402 when lifted by water. The gas release valve 402 may define an ingress point at which a fluid can enter the water pump 102. For example, when the gas release valve 402 is open, gas may enter (rather than exit) the water pump 102. However, because the gas release valve 402 is positioned in the space 114 defined by the housing 112, substantially all of the gas that enters the water pump 102 through the gas release valve 402 will be the inert gas (rather than ambient air, which may include oxygen).

Figure 5:
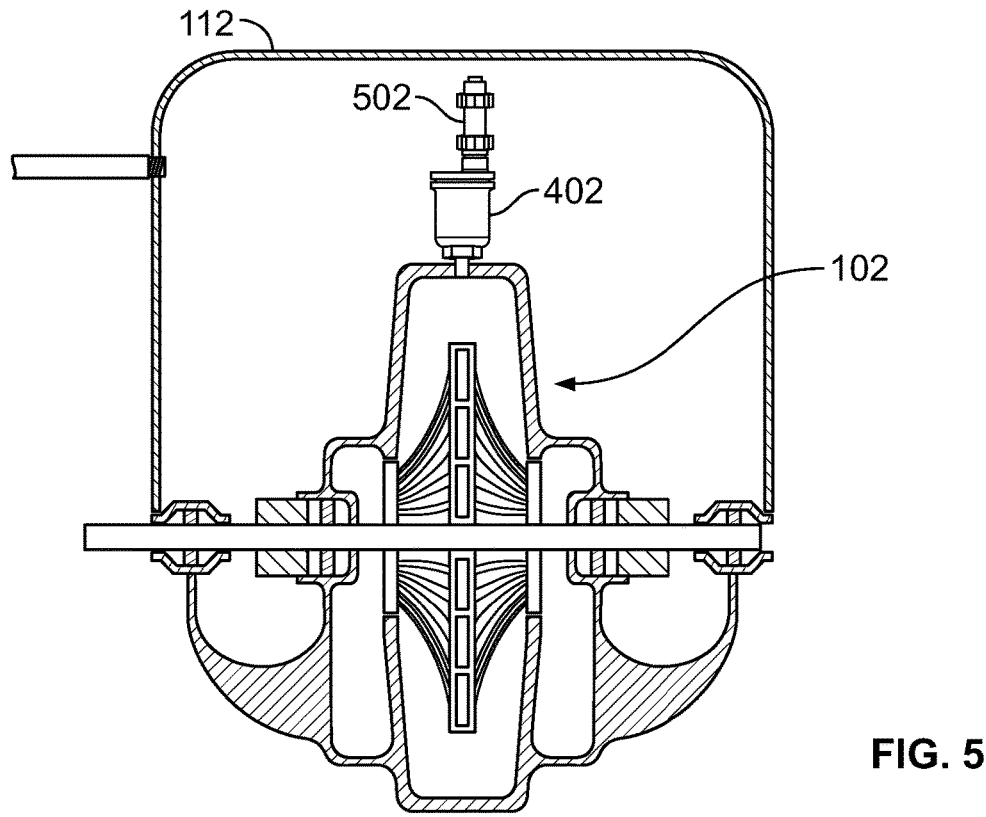
FIG. 5 is a sectional view of a pump assembly having a check valve coupled to a gas release valve according to yet another example embodiment.

Additionally, the gas release valve 402 may be coupled to a check valve 502, as shown in FIG. 5, to ensure gas can only exit (and not enter) the water pump 102 via the gas release valve 402. Although the check valve 502 is shown coupled to the outlet of the gas release valve 402, the check valve may instead be coupled to the inlet of the gas release valve 402 (i.e., between the gas release valve 402 and the water pump 102). Further, the check valve 502 may be a pressure release valve configured to open when the pressure in the water pump 102 reaches a defined pressure level.

In the example of FIG. 5, the check valve 502 is shown fully positioned within the housing 112. Therefore, any gas that exits the water pump 102 via the gas release valve 402 will enter the space 114 defined by the housing 112. Alternatively, an outlet of the check valve 502 may be positioned external to the housing 112 such that any gas exiting the water pump 102 via the gas release valve 402 will be released to the environment on the external side of the housing 112.

Figure 6:
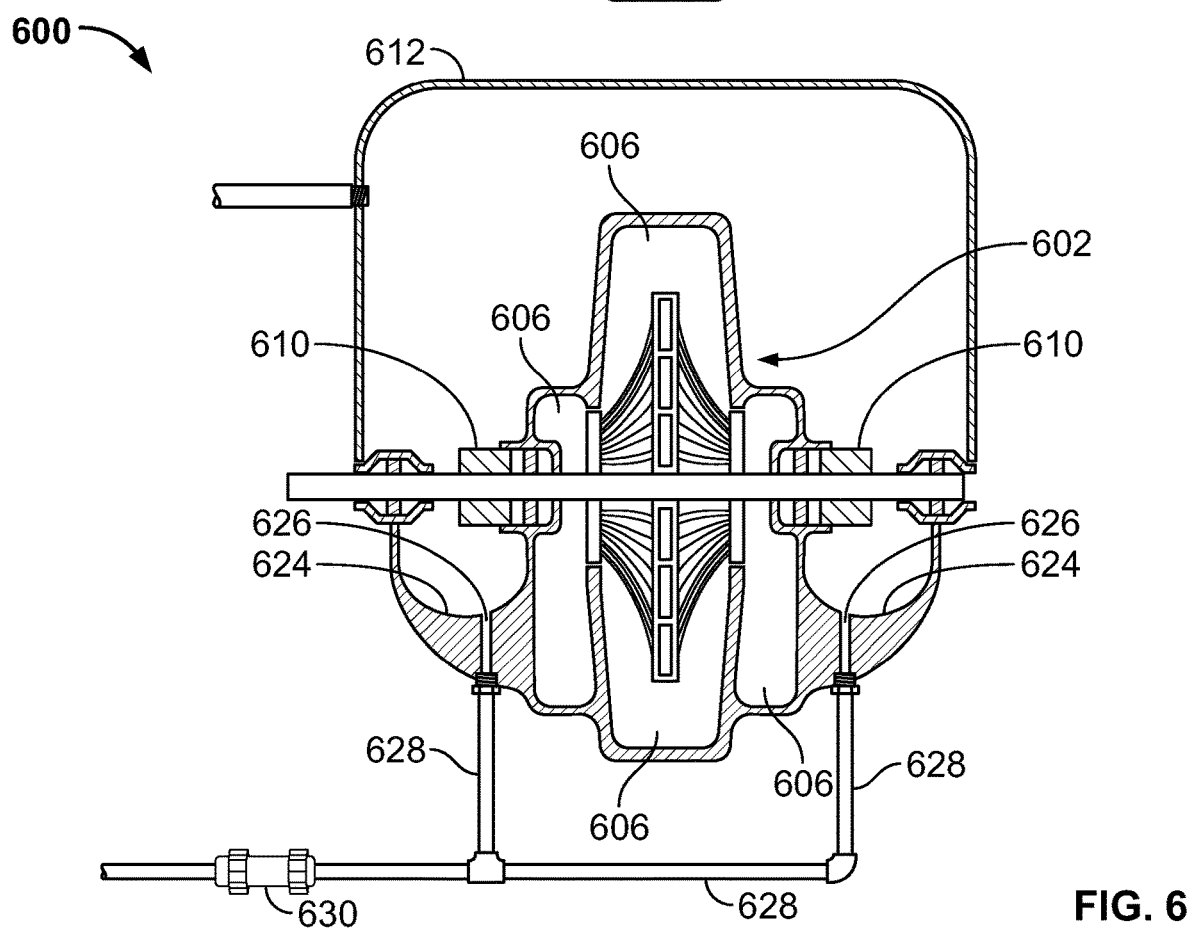
FIG. 6 is a sectional view of a pump assembly having a drain line coupled to check valve according to another example embodiment.

FIG. 6 illustrates a pump assembly 600 according to another example embodiment of the present disclosure. The pump assembly 600 of FIG. 6 is similar to the pump assembly 100 of FIG. 1. However, the assembly 600 of FIG. 6 includes seals 610 that are lubricated by water and, for this purpose, are designed to allow small amounts of water to pass by the seals 610 and exit the pump chamber 606. Therefore, the pump assembly 600 further includes catch bowls 624 having drain passages 626 connected to drain lines 628 for conveying the water that passes by the seals 610 to an appropriate location, such as a floor drain. In known pump assemblies, such drain passages and drain lines may define ingress points at which fluids (including oxygen from ambient air) can enter the water pump. However, the pump assembly 600 of FIG. 6 includes a check valve 630 coupled to the drain line 628. The check valve 630 allows water to flow through the check valve 630 in a direction away from the water pump 602, but prevents ambient air, including oxygen it may contain, and other fluids to pass through the check valve 630 in a direction towards the water pump 602.

Figure 7:
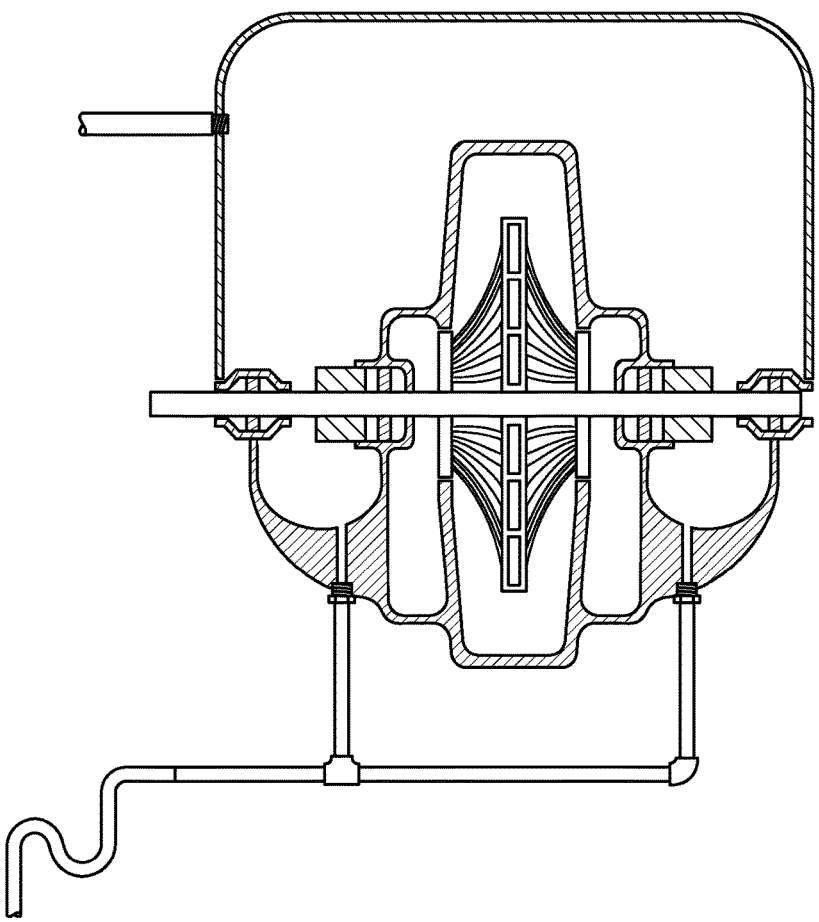
FIG. 7 is a sectional view of a pump assembly having a drain line coupled to a water trap according to still another example embodiment.

Alternatively, the pump assembly 600 may include another suitable device to inhibit ambient air, including oxygen it may contain, from entering the water pump 602 via the drain line 628 and drain passages 626. For example, the check valve 630 shown in FIG. 6 can be replaced with a trap (e.g., a P trap), as shown in FIG. 7. It should be understood that, in other embodiments, the check valve 630 shown in FIG. 6 and the trap shown in FIG. 7 can be employed without the housing 612 shown in FIGS. 6 and 7 and discussed above.

Figure 8:
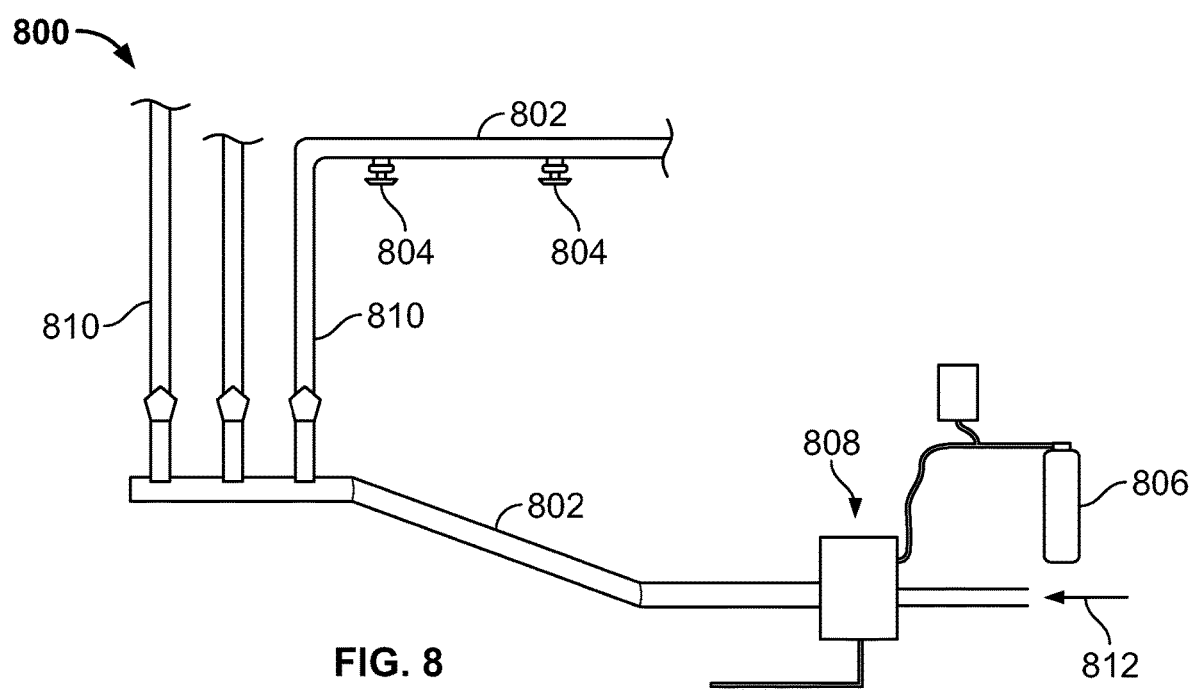
FIG. 8 is a block diagram of a water-based fire sprinkler system according to another example embodiment.

The pump assemblies disclosed herein may be employed in a wide variety of water supply systems, including water supply systems for water-based fire sprinkler systems. FIG. 8 illustrates one example embodiment of a water-based fire sprinkler system 800 including a piping network 802, one or more sprinklers 804, an inert gas source 806, and a pump assembly 808 coupled to the piping network 802 and the inert gas source 806.

As shown in FIG. 8, the piping network 802 of FIG. 8 may include one or more riser(s) 810 and other pipes coupled between the pump assembly 808 and the sprinklers 804. Although FIG. 8 illustrates three risers 810 and two sprinklers 804, more or fewer risers and/or sprinklers may be employed in any given implementation, as apparent to those skilled in the art of fire sprinkler systems. Likewise, the system 800 of FIG. 8 may include numerous other components such as, for example, various valves (e.g., a dry pipe or wet pipe valve, shut off valves, etc.), fittings, etc.

The pump assembly 808 receives water from a water source, such as a municipal water source, as indicated by arrow 812, and pumps water to the sprinklers 804 via the piping network 802. In doing so, the pump assembly 808 may increase the pressure and/or flow rate of the water as necessary to meet applicable standards and requirements. For example, a municipal water source may have a typical water pressure of about 100 PSI. When activated, the pump assembly 808 may increase the water pressure within the piping network 802 to about 250 PSI or higher. Such higher pressure(s) may be needed if the water-based fire sprinkler system 800 is employed in a multi-story building where water is supplied to sprinklers at higher elevations.

The pump assembly 808 of FIG. 8 may take the form of any of the various pump assemblies described herein. Accordingly, the pump assembly 808 may include one or more housings surrounding on or more ingress points at which fluids can enter the water pump, one or more gas release valves, one or more controllers for controlling the flow of inert gas, drain lines, check valves, water traps, etc.

The inert gas source 806 may be, for example, a purified nitrogen storage tank (e.g., a nitrogen cylinder), a nitrogen generator, etc.

Figure 9:
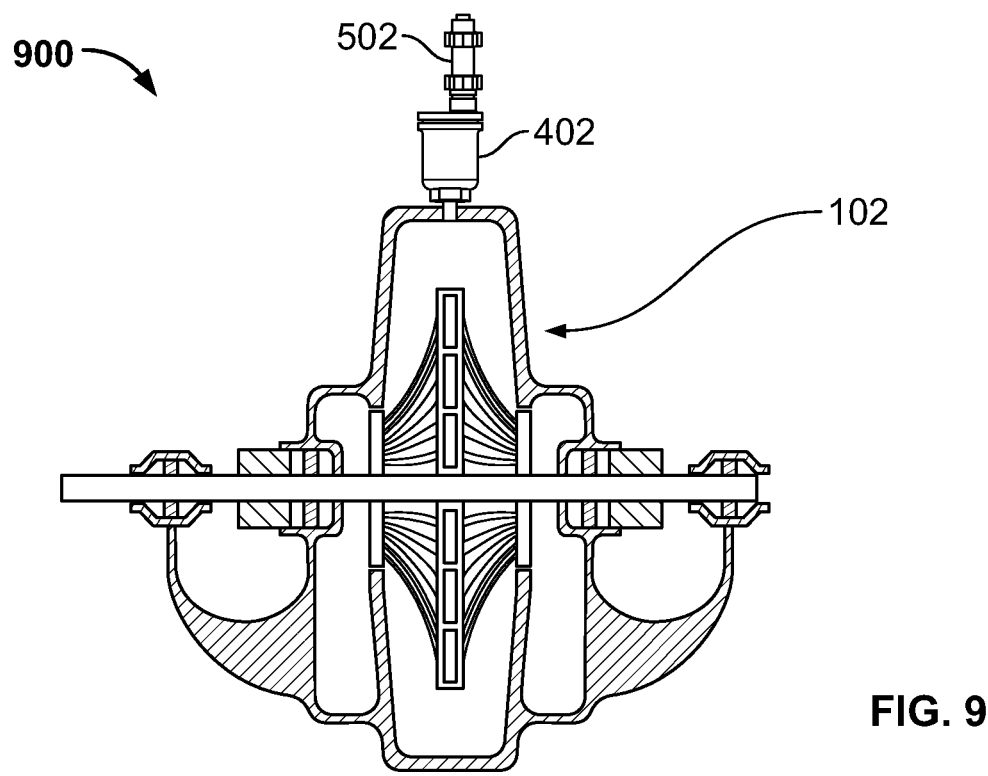
FIG. 9 is a sectional view of a pump assembly including a gas release valve and a check valve according to another example embodiment.

FIG. 9 illustrates a pump assembly 900 according to another example embodiment of this disclosure. The pump assembly 900 includes the water pump 102 of FIG. 1, the gas release valve 402 described above with reference to FIGS. 4 and 5, and the check valve 502 described above with reference to FIG. 5. The check valve 502 ensures gas can only exit (and not enter) the water pump 102 via the gas release valve 402. Although the check valve 502 is shown coupled to the outlet of the gas release valve 402, the check valve may instead be coupled to the inlet of the gas release valve 402 (i.e., between the gas release valve 402 and the water pump 102). In other embodiments, the pump assembly 900 may also include drain line(s) and additional check valve(s) or water traps to inhibit ambient air, including oxygen it may contain, from entering the water pump 102 via the drain line(s).

Figure 10:
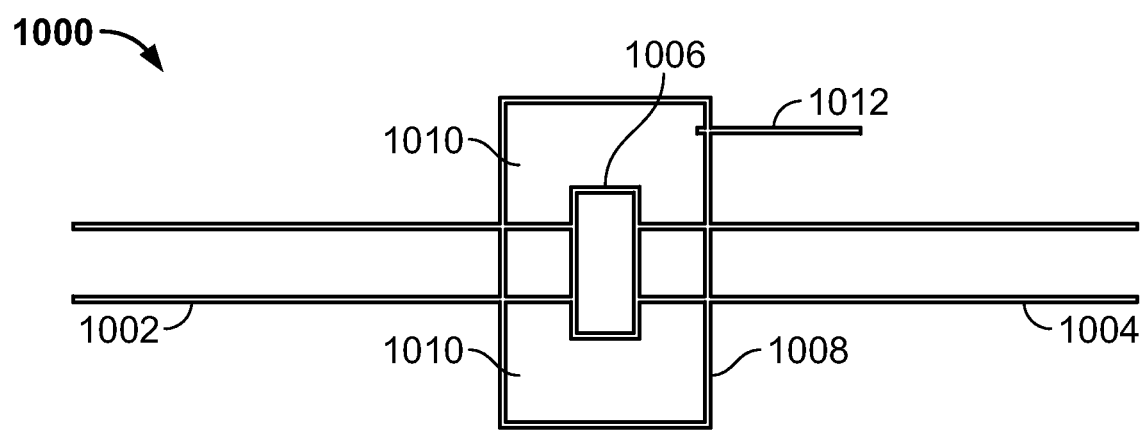
FIG. 10 is a block diagram of a piping network having a pipe joint defining one or more ingress points according to another example embodiment.

FIG. 10 illustrates a piping network 1000 according to another example embodiment of the present disclosure. As shown in FIG. 10, the piping network 1000 includes two pipes 1002, 1004 coupled to one another via a pipe joint 1006. The pipe joint 1006 may include a leaky weld or mechanical fitting that permits, at least to a limited extent, fluid to enter the piping network 1000. In other words, the pipe joint 1006 may define an ingress point. Accordingly, the piping network 1000 of FIG. 10 further includes a housing 1008 surrounding the pipe joint 1006 and defining a space 1010 between the housing 1008 and the pipe joint 1006.

The housing 1008 is adapted for coupling to an inert gas source in any suitable manner, including as described above with reference to the housing 112 of FIG. 1. For example, the housing 1008 may be coupled to a gas supply line 1012 for conveying the inert gas from the inert gas source to the space 1010 within the housing 1008, as shown in FIG. 10. Therefore, when the pipe joint 1006 permits fluid to enter the piping network 1000, substantially all of the fluid that enters will be the inert gas rather than ambient air, including oxygen it may contain.

The gas supply line 1012 may include an electromechanically operated valve (e.g., a solenoid valve) coupled to a controller for opening and closing the valve or otherwise controlling the flow of inert gas into the housing 1008. The valve and controller may be configured, e.g., as described above with reference to the valve 218 and controller 302 of FIG. 3.

Figure 11:
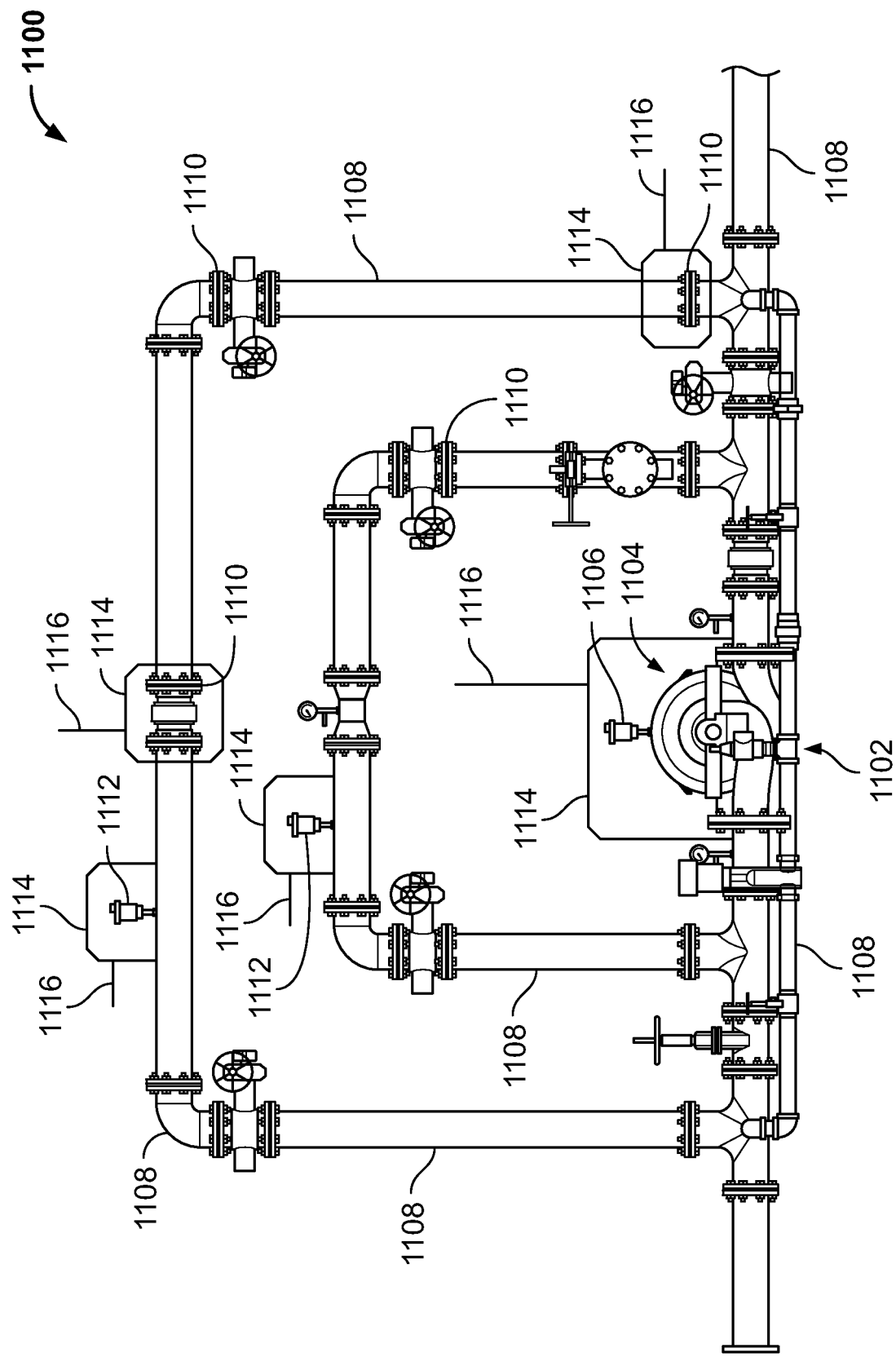
FIG. 11 is a front view of a water supply system having a water pump, gas release valves and pipe fittings according to another example embodiment.

FIG. 11 illustrates an example water supply system 1100 including a pump assembly 1102, pipes 1108, pipe fittings 1110, and gas release valves 1112. Each pipe fitting 1110 is coupled between two or more of the pipes 1108 and each gas release valve 1112 is coupled to one of the pipes 1108. The pump assembly 1102 includes a water pump 1104, seals (not shown) and a gas release valve 1106 coupled to the water pump 1104. The water pump 1104 and the gas release valves 1106, 1112 may be substantially similar to the water pump 102 of FIG. 4 and the gas release valve 402 of FIG. 4.

In the example of FIG. 11, ingress point(s) as explained above may be adjacent some or all of the pipe fittings 1110, defined by some or all of the gas release valves 1106, 1112, adjacent seals of the water pump 1104, etc. Therefore, the water supply system 1100 may include housings 1114 to surround one or more of the ingress point(s).

As shown in FIG. 11, the housings 1114 surround ingress point(s) adjacent two pipe fittings 1110, ingress point(s) defined by two gas release valves 1112, and ingress point(s) of the pump assembly 1102.

The housings 1114 may be adapted for coupling to an inert gas source (not shown) via inert gas supply lines 1116. Thus, inert gas may be supplied to space between the housings 1114 and the ingress point(s) to thereby allow the inert gas to enter the water supply system 1100 at the ingress point(s) and substantially inhibit ambient air, including oxygen it may contain, from entering the water supply system 1100 at the ingress point(s) to substantially inhibit oxygen corrosion in the water supply system 1100.

The housings 1114 may be substantial similar to the housing 112 and/or the housing 1008, both of which are explained above. Additionally, the inert gas supply lines 1116 may be substantially similar to the inert gas supply line 116 of FIG. 1.

As shown in FIG. 11, the housings 1114 may extend entirely around one or more of the pipes 1108 and/or partially around one or more of the pipes 1108. For example, the housings 1114 surrounding the ingress point(s) adjacent the pipe fittings 1110 extend entirely around one or more of the pipes 1108 while the housings 1114 surrounding the ingress point(s) defined by the gas release valves 1112 extend partially around one or more of the pipes 1108.

Additionally and/or alternatively, the water supply system 1100 may include one or more of the optional feature(s) explained above. For example, the water supply system 1100 may include one or more controllers, drains, check valves, water traps, etc.

As shown in FIG. 11, the pipes 1108 may form by-pass loops to pass water around the pump assembly 1102. Although three by-pass loops are shown in FIG. 11, the water supply system 1100 may include more or fewer by-pass loops.

Figure 12:
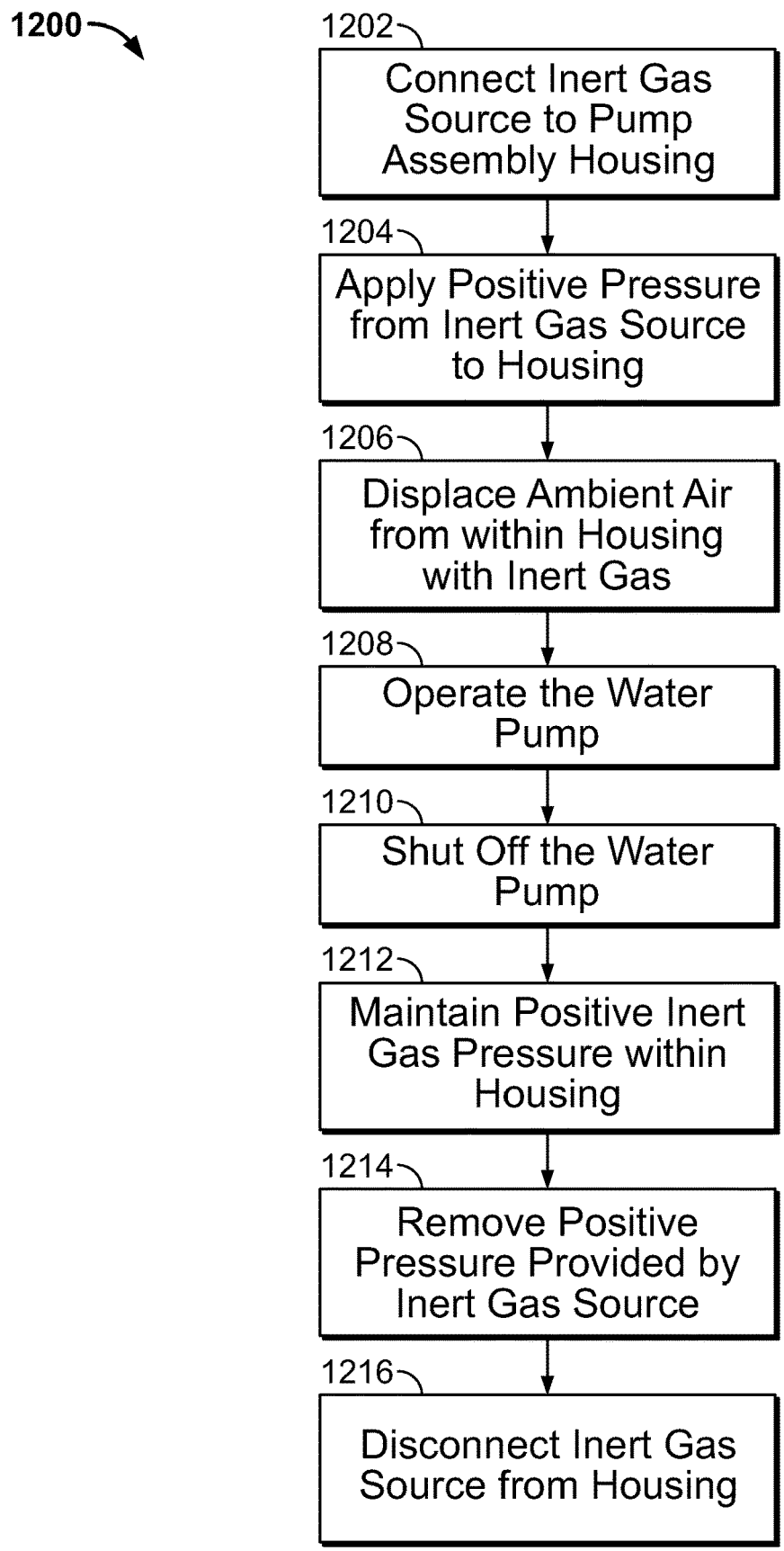
FIG. 12 is a flow diagram of a process for operating a water pump according to another example embodiment.

FIG. 12 illustrates one example method 1200 that may be performed to inhibit ambient air, including oxygen it may contain, from entering a water supply system by using a pump assembly having a housing that is substantially similar to the pump assemblies described above. As shown in FIG. 12, an inert gas source is connected to a housing of a pump assembly through a gas supply line in step 1202. In step 1204, the inert gas source is used to apply a pressure of inert gas to the housing that is greater than the pressure of the ambient air in the space within the housing, i.e., a positive pressure. The positive pressure from the inert gas displaces the ambient air from the space within the housing and replaces the ambient air (including oxygen that ambient air may contain) with the inert gas in step 1206. In step 1208, the water pump is activated, e.g., to test its operation, as part of a fire event, etc. In step 1210, the water pump is shut off.

Throughout the operation of the water pump and until it is shut off in step 1210, the inert gas source continues to supply inert gas at a positive pressure to the housing. After the water pump is shut off in step 1210, the inert gas source continues to maintain positive inert gas pressure within the housing in step 1212 until the pressure within the water supply system near the housing is substantially equal to or greater than the pressure of the inert gas within the housing such that the inert gas is no longer drawn into the water pump or the water supply system from within the housing. For example, positive inert gas pressure may be maintained until a predetermined amount of time elapses, until pressure measurements are within an acceptable level, until a gas flow is no longer audible, etc. In step 1214, once the pressure within the water supply system is substantially equal to or greater than the pressure of the inert gas, the positive pressure provided to the housing by the inert gas source is removed such that the pressure within the housing may reduce to that of the ambient atmosphere. As a result, ambient air may gradually mix with the inert gas within the housing, but will not enter into the water supply system. In step 1216, the inert gas source is disconnected from the pump assembly housing and/or supply line.

Figure 13:
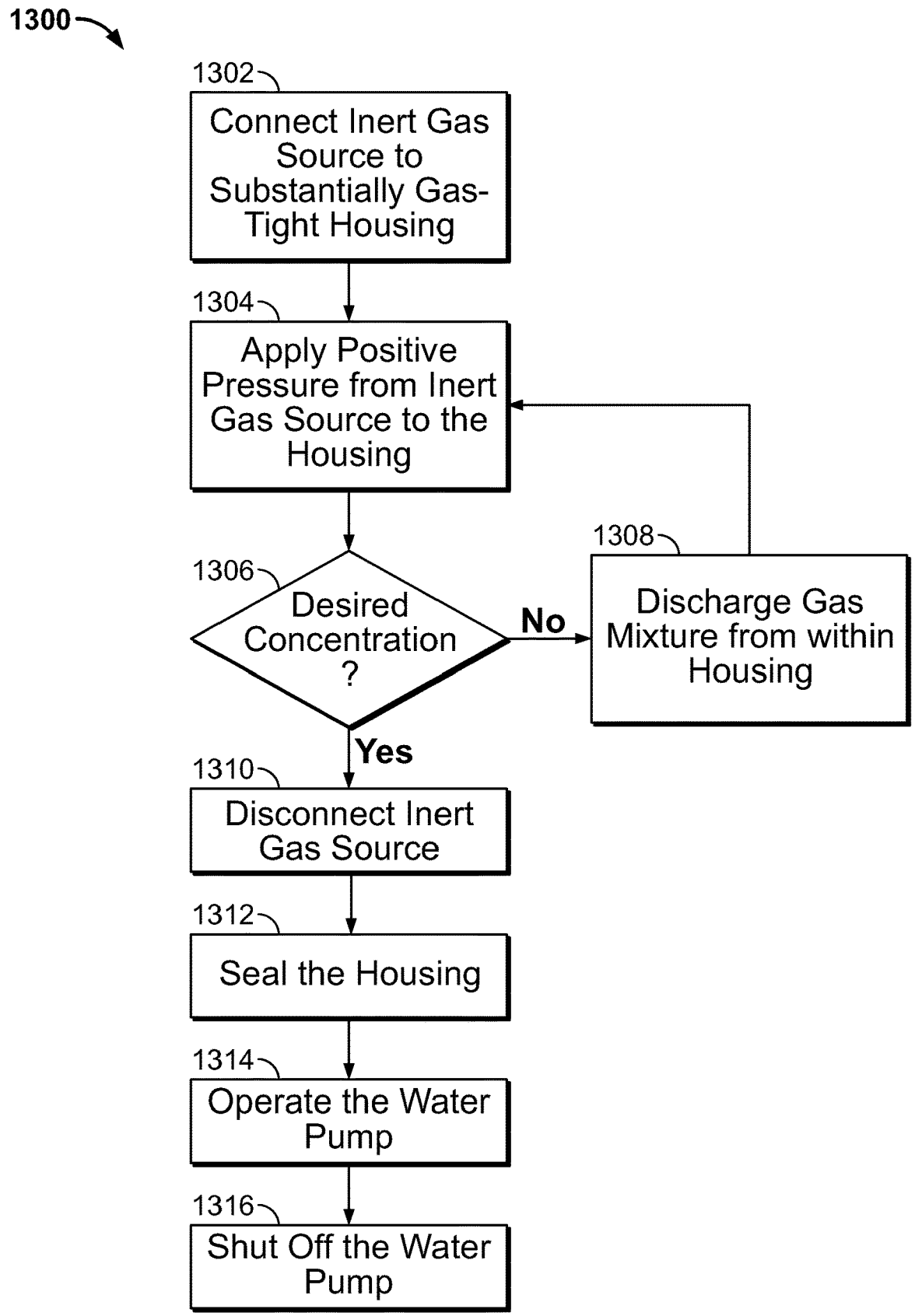
FIG. 13 is a flow diagram of a process for operating a water pump according to yet another example embodiment.

FIG. 13 illustrates another example method 1300 that may be performed to inhibit air including oxygen from entering a water supply system by using a pump assembly having a housing that forms a substantially gas-tight seal. As shown in FIG. 13, an inert gas source is connected to a pump assembly having a substantially gas-tight housing surrounding a point of ingress in step 1302. For example, the housing forms a seal with the assembly that substantially inhibits the flow of gases between the space within the housing and the ambient air outside the housing. In step 1304, the inert gas source is used to apply a pressure of inert gas to the housing that is greater than the pressure of the ambient air in the space within the housing, i.e., a positive pressure.

In step 1306 of FIG. 13, the concentration of a gas (an inert gas, oxygen, or another gas in ambient air) within the housing is compared to a desired concentration to determine whether the space within the housing is inert. For example, this comparison may be performed using a gas analyzer, inferred based on the positive pressure applied, based on a predetermined number of pressurization and discharge cycles as described below, and the like. If the desired concentration of gas within the housing has not been reached, the mixture of gases (e.g., inert gas and ambient air) within the housing is discharged from within the housing in step 1308 through, e.g., a vent or other suitable passage. Once the gases are discharged, further positive pressure from the inert gas source is applied in step 1304 as explained above. This process of pressurizing with inert gas, discharging the mixture and repeating will eventually obtain the concentration of inert gas within the housing. If the desired concentration of gas within the housing has been reached, the space within the housing contains a suitably inert gas and the source of inert gas can be disconnected in step 1310. In step 1312, the housing is sealed so that the space within the housing does not mix with ambient air. In step 1314, the water pump is activated, e.g., to test its operation, as part of a fire event, etc. In step 1316, the water pump is shut off.

Methods 1200 and 1300 are exemplary only. Although the methods are described with respect to a pump assembly, similar processes can be performed with respect to a housing surrounding a point of ingress formed by a pipe joint, e.g., as shown in FIG. 10. Likewise, these processes can be applied to a housing surrounding any other point of ingress into a water-based fire sprinkler system. Alternately, or in addition, the processes can be applied simultaneously or successively to one or more housings that surround separate portions of a water-based fire sprinkler system. As a further alternative, it is not necessary for the process to include the operation of a water pump within a water pump assembly in steps 1208, 1210 of FIG. 12 and steps 1314, 1316 of FIG. 13. For example, the process may be modified to be performed with respect to the operation of a component of a water supply system, the operation of a component of a water-based fire sprinkler system, the performance of a maintenance task, the performance of an operational task on such systems, etc.

As yet another alternative, it is not necessary that each step shown in FIG. 12 be performed each time that process 1200 is performed. For instance, connection and disconnection of the inert gas source may not always be performed if the inert gas source is permanently installed. Likewise, the application and removal of positive inert gas pressure may not be performed each time the water pump is activated if the housing is substantially sealed after being filled with inert gas.

Further, it is not necessary that each step shown in FIG. 13 be performed each time process 1300 is performed or the water pump is operated. For example, once the space within a substantially gas-tight housing has been filled with inert gas at a desired concentration, the water pump may be operated or other system components may be used without connecting and disconnecting the source of inert gas again. Alternately, the process may be performed without operating or shutting-off a water pump at all. These modifications described above and others are each intended to be within the scope of this disclosure.

The housings disclosed herein may be formed of any suitable material(s). For example, the housings may comprise a polymer, etc. and may be rigid or flexible. The housings may be connected to the water-based fire sprinkler system permanently or temporarily using any suitable mechanism, including adhesive, one or more fasteners, tension, etc. Additionally, the housings may not form a gas tight seal. In such cases, the inert gas supplied to the housings is preferably greater than atmospheric pressure to inhibit ambient air, including oxygen it may contain, from entering the housings.

Alternately, the housings may form a seal that is substantially gas tight. In such cases, the inert gas supplied to and/or within the housings may be mixed with any ambient air in a manner suitable to reduce the concentration of ambient air, and thereby the concentration of oxygen, to approximately the same concentration as is present in the source of inert gas. For instance, the repeated pressurization and depressurization of the housings with an inert gas, whereby each depressurization discharges ambient air mixed with inert gas out of the housing, is suitable for this purpose. An example of such a breathing process is described in WO 2011/056580, the entire disclosure of which is incorporated herein by reference.

Although the water pumps illustrated in the figures are centrifugal pumps, it should be understood that the teachings herein are not limited to centrifugal pumps and can be used with virtually any type of water pump including, for example, axial-flow pumps, mixed-flow pumps, etc.

In some embodiments, the inert gas is supplied to the space between a housing and a water pump and/or a gas release valve at a low pressure (e.g., between about 2 PSIG and about 5 PSIG).

As noted above, a water pump may entrain and disperse air (e.g., gas bubbles including oxygen) in the water it supplies to a piping network that serves as a water supply line to one or more zones of a fire sprinkler system. The ingress of air (including oxygen) may be due to the operation of the water pump's impeller, when applicable, due to air entering one or more gas release valves, etc. This air may form gas pockets downstream of the water pump, causing significant corrosion of the piping network.

For example, when a water pump is operated, air including any external air entering the water pump may be churned with the water by the impeller. In some cases, this air (e.g., gas bubbles including oxygen) is entrained into the water as it is discharged into the piping network and/or oxygen (from the air) may be sparged into the water thus raising the amount of dissolved oxygen in the water to the saturation limit.

By introducing external air into the piping network, oxygen corrosion may occur as dissolved oxygen in the water contacts the piping network downstream of the water pump. Additionally, the entrained air in the water may be pushed into the piping network including, for example, risers (as explained above) and/or other pipes in the system.

In some cases, the entrained air agglomerates and forms trapped air pockets in the piping network (e.g., at high points in the risers, etc.). Further, in some systems, check valves (also referred to as "alarm checks" or "zone valves") are positioned downstream of the water pump. These check valves, which are typically coupled to the risers, maintain water pressure in different zones of the piping network even if a pipe between the check valve and the water pump depressurizes. The entrained air may collect and form trapped air pockets on an inlet side of these check valves. Thus, the trapped air pockets (e.g., in the vertical risers) serve as reservoirs of oxygen thereby increasing the likelihood of oxygen corrosion near these trapped air pockets (e.g., near the inlet side of the check valves on the vertical risers, etc.).

Figure 14:
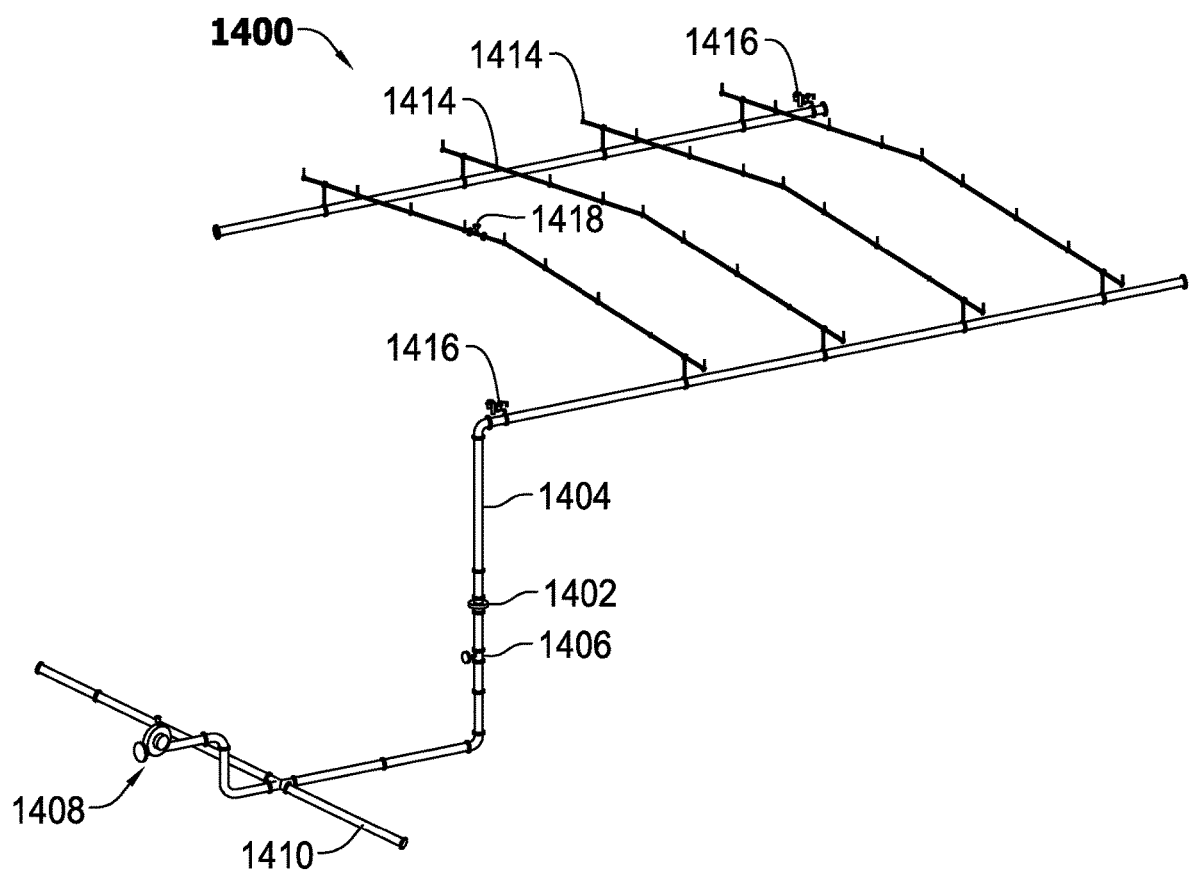
FIG. 14 illustrates a typical water supply system for a water-based fire sprinkler system, and a representative sprinkler system.
Figure 21:
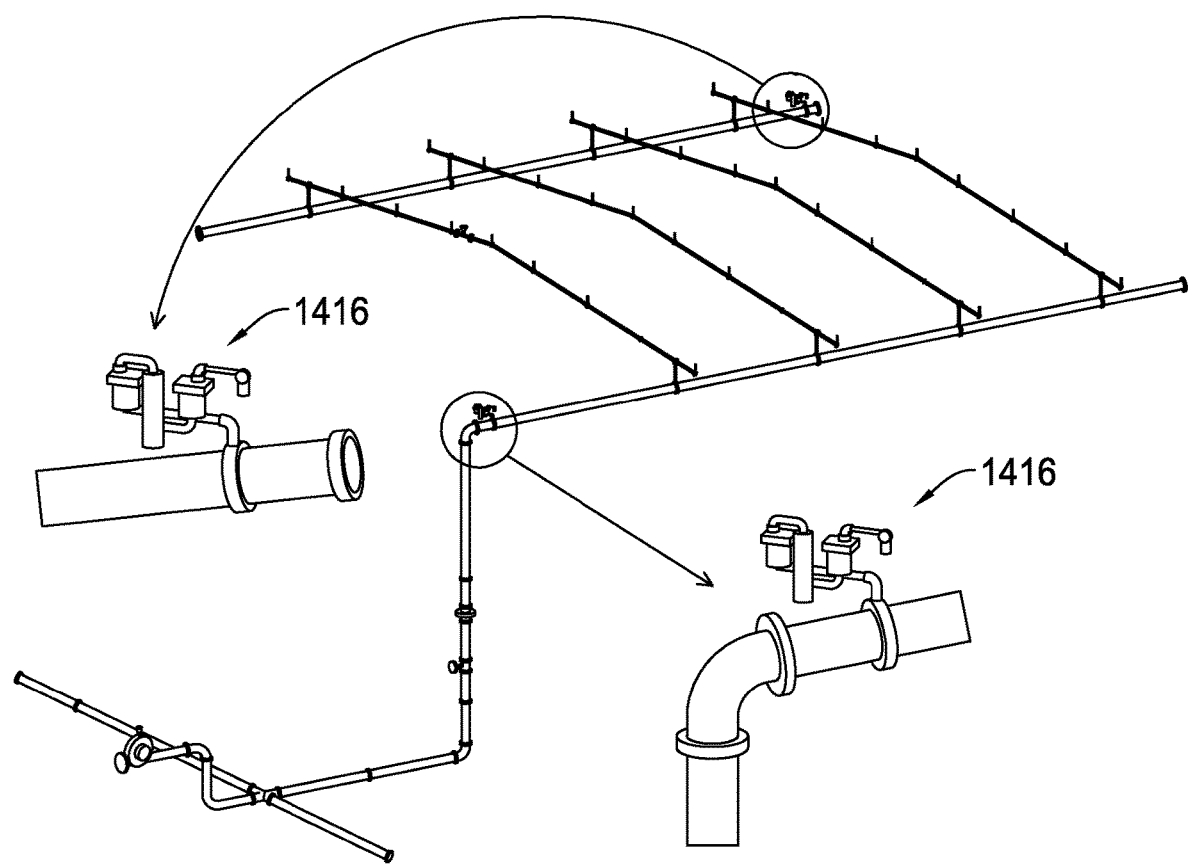
FIG. 21 illustrates the vents of FIG. 20 in greater detail.

For example, FIG. 14 illustrates one zone of a fire sprinkler system in which a check valve 1402 is coupled to a riser 1404 above a control valve 1406. The fire sprinkler system also includes sprinklers 1414, vents 1416 (shown in more detail in FIG. 21), and a corrosion detector 1418. A water pump 1408 supplies water under pressure to the illustrated zone, as well as other zones via a water supply loop 1410. Additional water pumps may be coupled to the loop 1410 as well for supplying pressurized water to numerous sprinkler zones.

Figure 15:
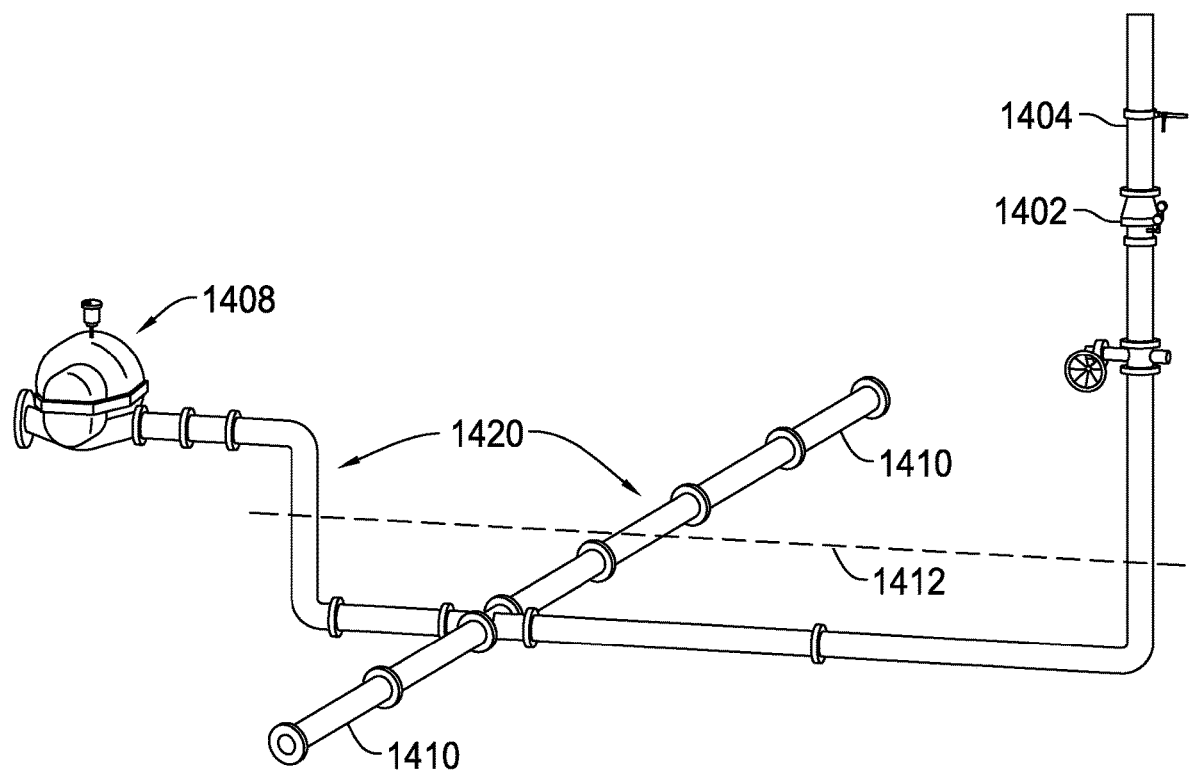
FIG. 15 illustrates the water supply system of FIG. 14 in greater detail.
Figure 16:
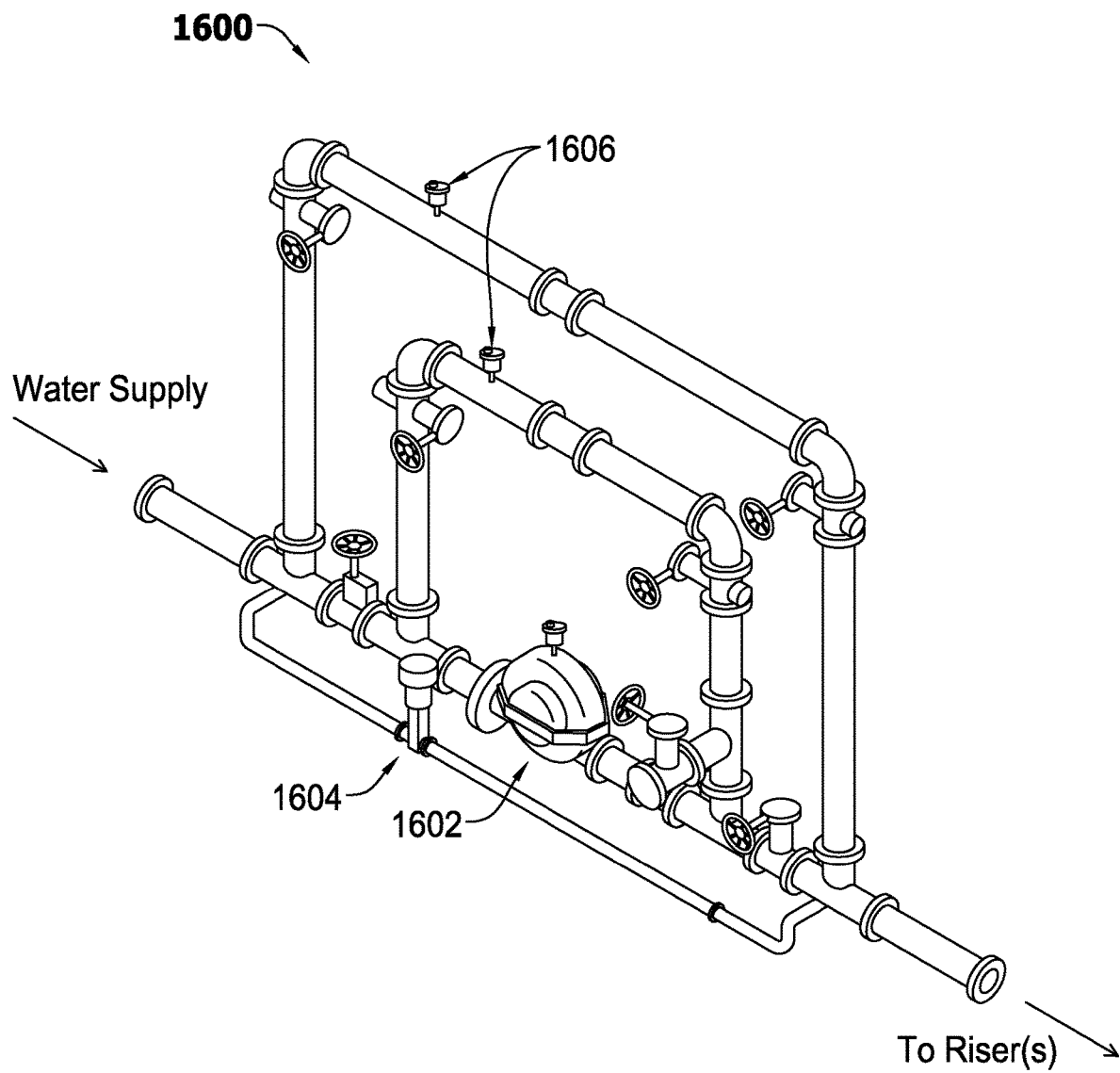
FIG. 16 illustrates an example water pump assembly for supplying water under pressure to one or more fire sprinkler zones.

FIG. 15 illustrates the water pump 1408 and portions of the piping network 1420 including the riser 1404 of FIG. 14. As shown in FIG. 15, some pipes of the piping network (e.g., the water supply lines) may be below ground level (indicated by line 1412). The piping network may supply water to different zones (e.g., in the same or different buildings, etc.) via one or more water loops 1410. The pipes may be ductile iron and cement lined pipes, flanged, etc. FIG. 16 illustrates a more complex water pump assembly 1600 that may be employed. As shown in FIG. 16, the water pump assembly 1600 includes a water pump 1602, a jockey pump 1604, and gas release valves 1606.

Figure 17:
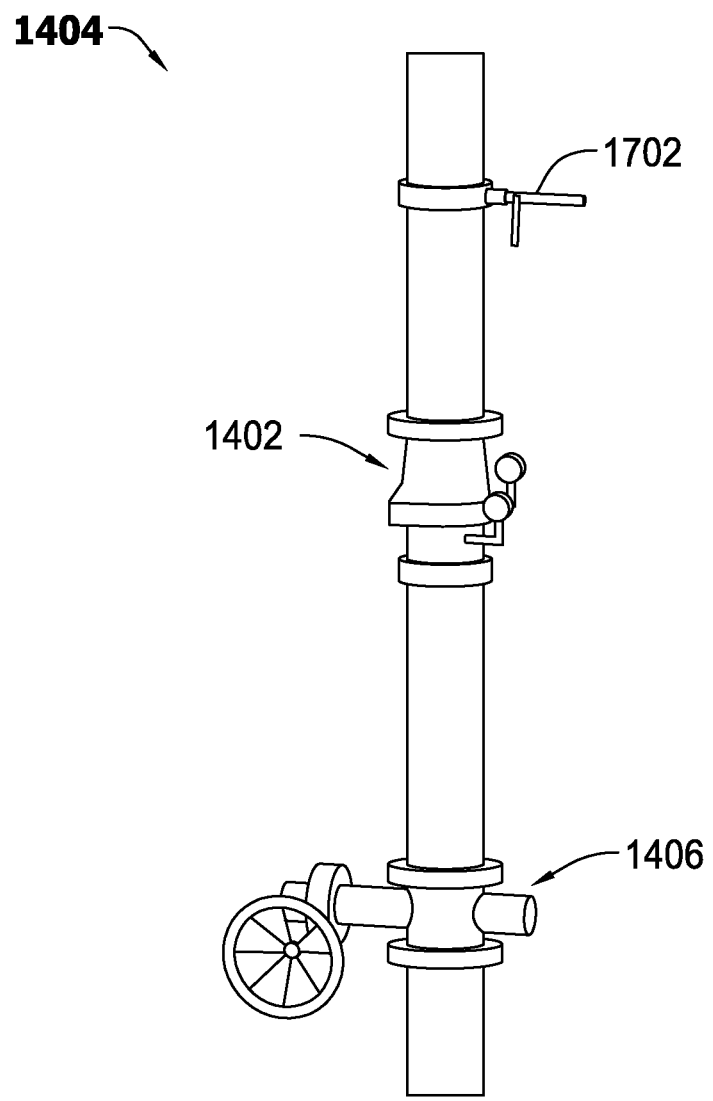
FIGS. 17 and 18 illustrate a typical riser for a fire sprinkler zone.

As shown in FIG. 17, the check valve 1402 of FIG. 14 is coupled to the riser 1404 between an inert gas injection port 1702 and a control valve 1406. That is, the check valve 1402 is coupled on an outlet side of the control valve 1406 and on an inlet side of the inert gas injection port 1702. The inert gas injection port may be used to introduce purified nitrogen or another suitable inert gas into the piping network on the outlet side of the check valve for inerting the downstream fire sprinkler zone (e.g., for fill and purge breathing, etc.).

Figure 18:
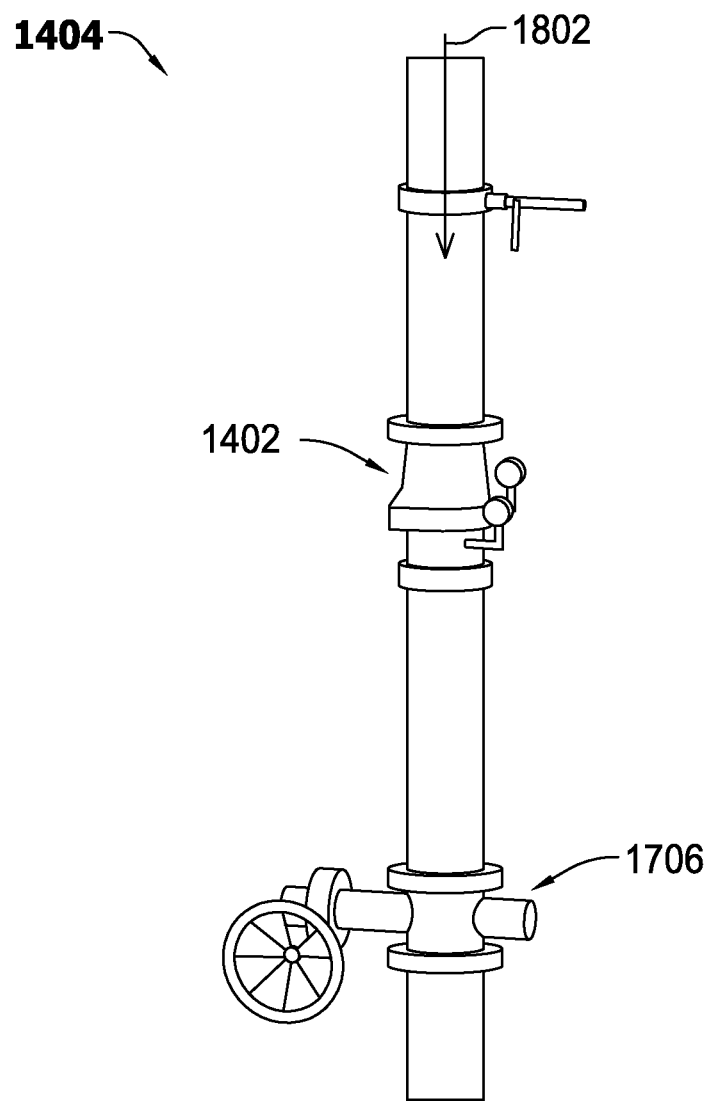

As shown in FIG. 18, the pressure in the piping network downstream of (i.e., above) the check valve 1402 may be greater than the pressure in the piping network upstream of (i.e., below) the check valve 1402. The higher pressure may be due to the water in the piping network above the check valve having a higher temperature (e.g., due to its location in a conditioned space) than water in the piping network below the check valve (e.g., some of which may be located underground). The higher pressure above the check valve (indicated by arrow 1802) may hold the check valve 1402 in the closed positioned.

Figure 19:
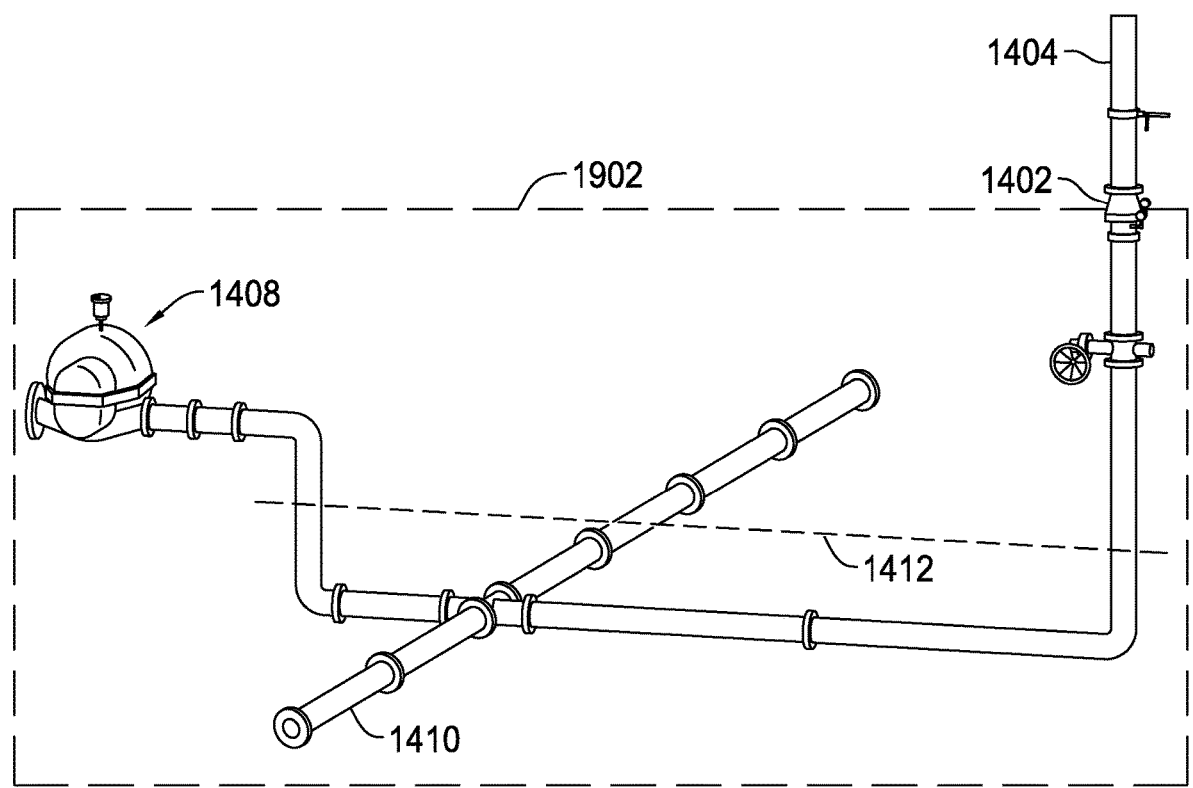
FIG. 19 illustrates another water supply system for a fire sprinkler system.
Figure 20:
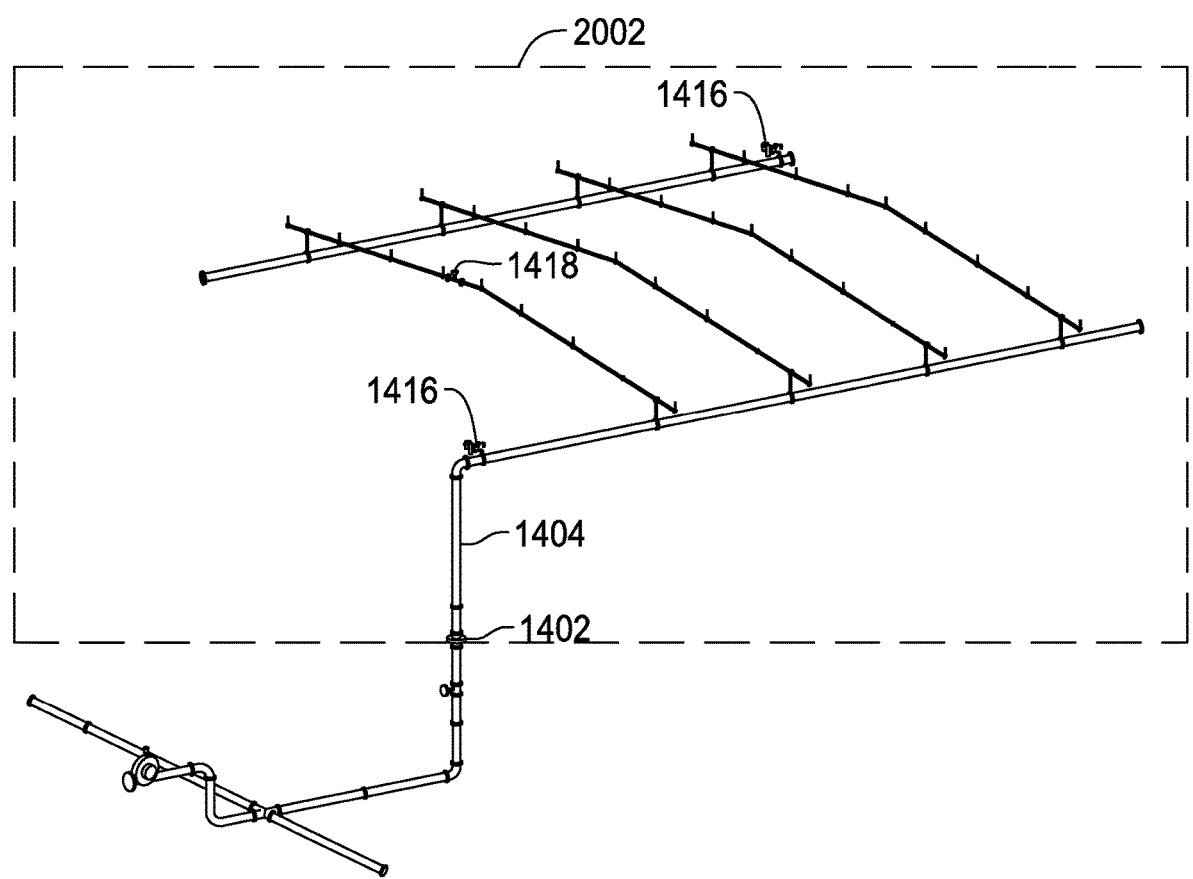
FIG. 20 illustrates a water supply system and an inerted fire sprinkler zone.

Therefore, when the fire sprinkler zone downstream of the check valve 1402 (illustrated by the box 2002 in FIG. 20) is inerted (e.g., with purified nitrogen), the portion of the piping network upstream of the closed check valve 1402 (illustrated by the box 1902 in FIG. 19) may not be inerted.

Figure 22:
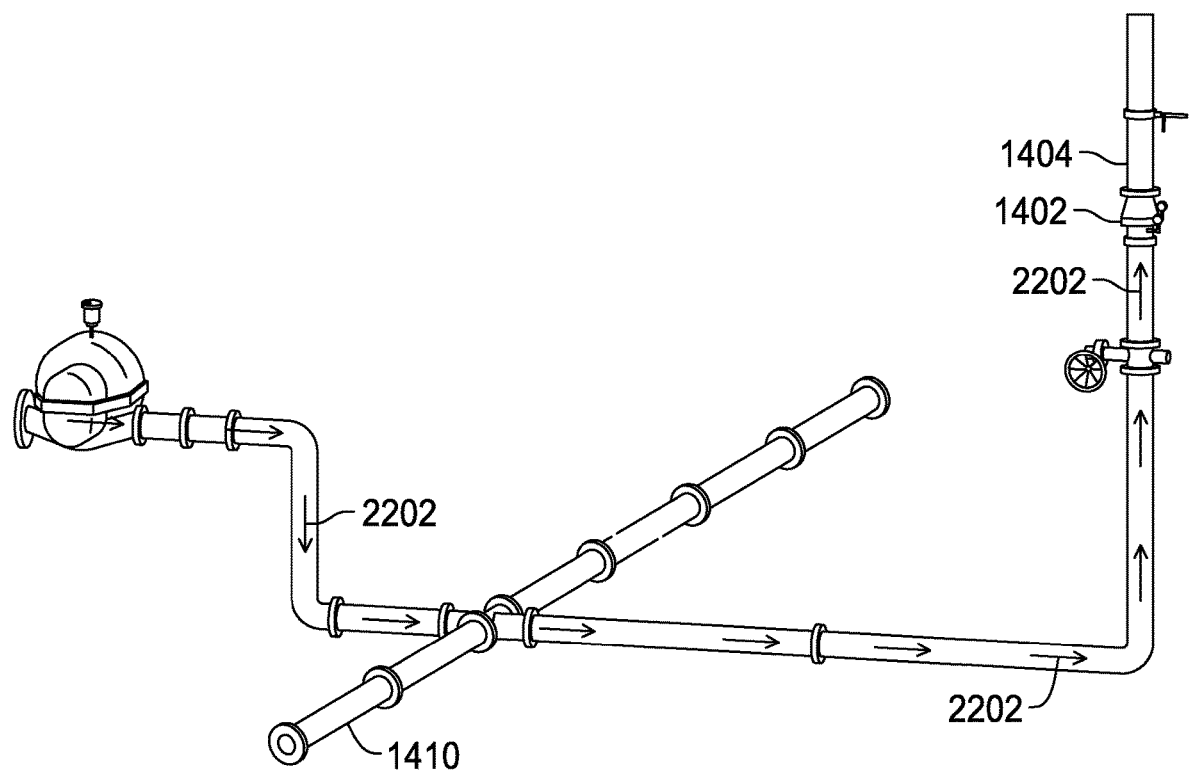
FIGS. 22-24 illustrate the air that can migrate and become trapped in the riser of a fire sprinkler zone.
Figure 23:
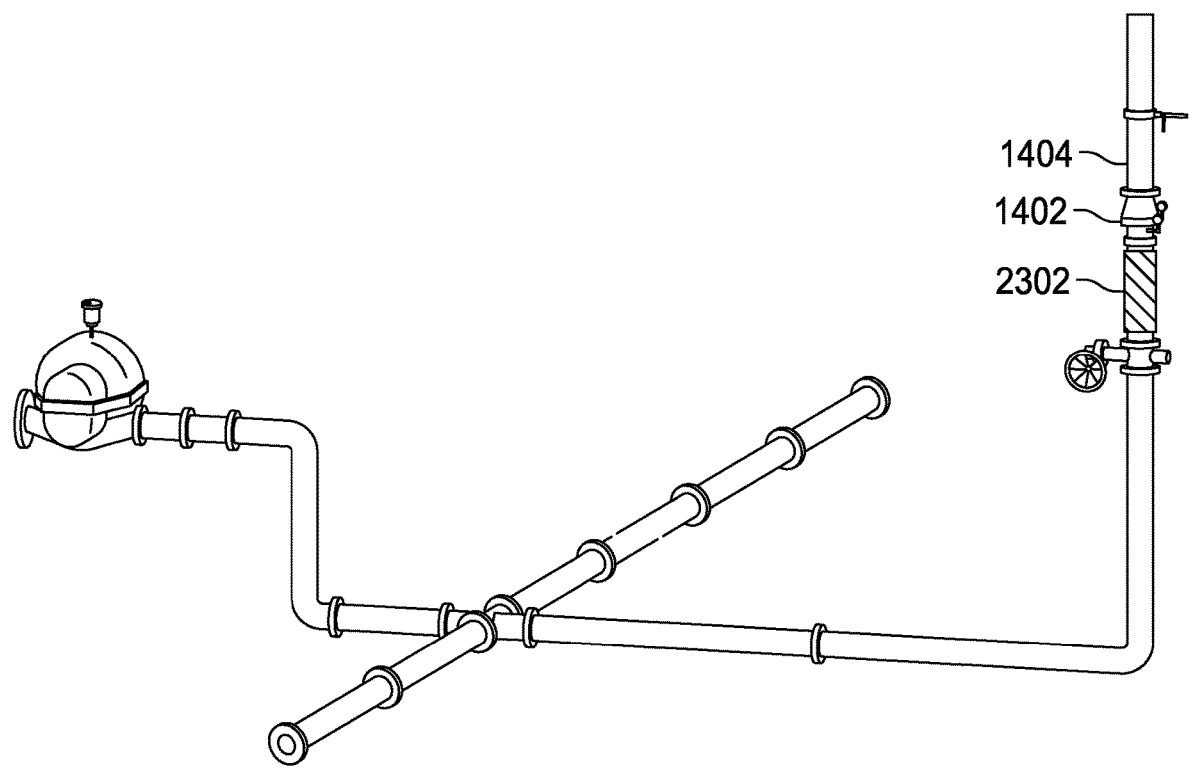
Figure 24:
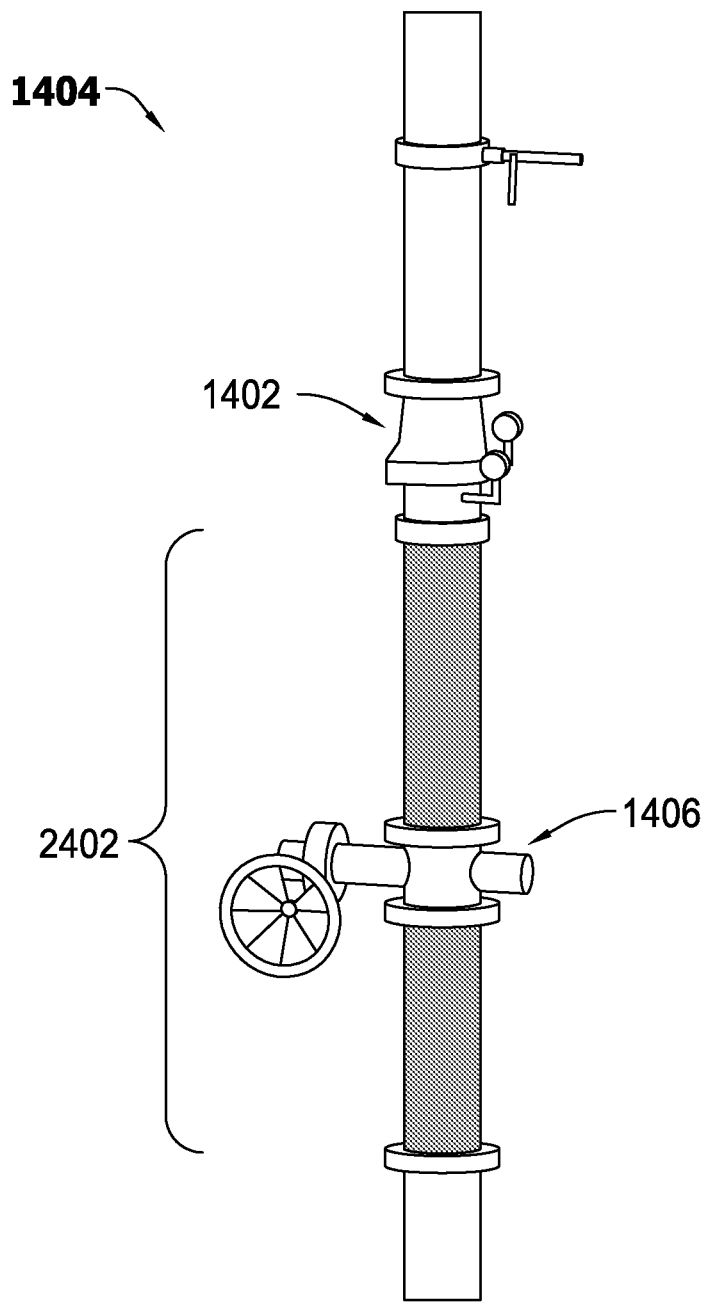

Further, when the check valve 1402 is closed, air migrating through the water supply line (indicated by arrows 2202) may collect and become trapped in the riser 1404 immediately below the check valve 1402 (indicated by reference number 2302), as shown in FIGS. 22 and 23. As shown in FIG. 24, the trapped air pocket (indicted by reference number 2402) may extend below the control valve 1406 (which is open when the fire sprinkler zone is in service).

Figure 25:
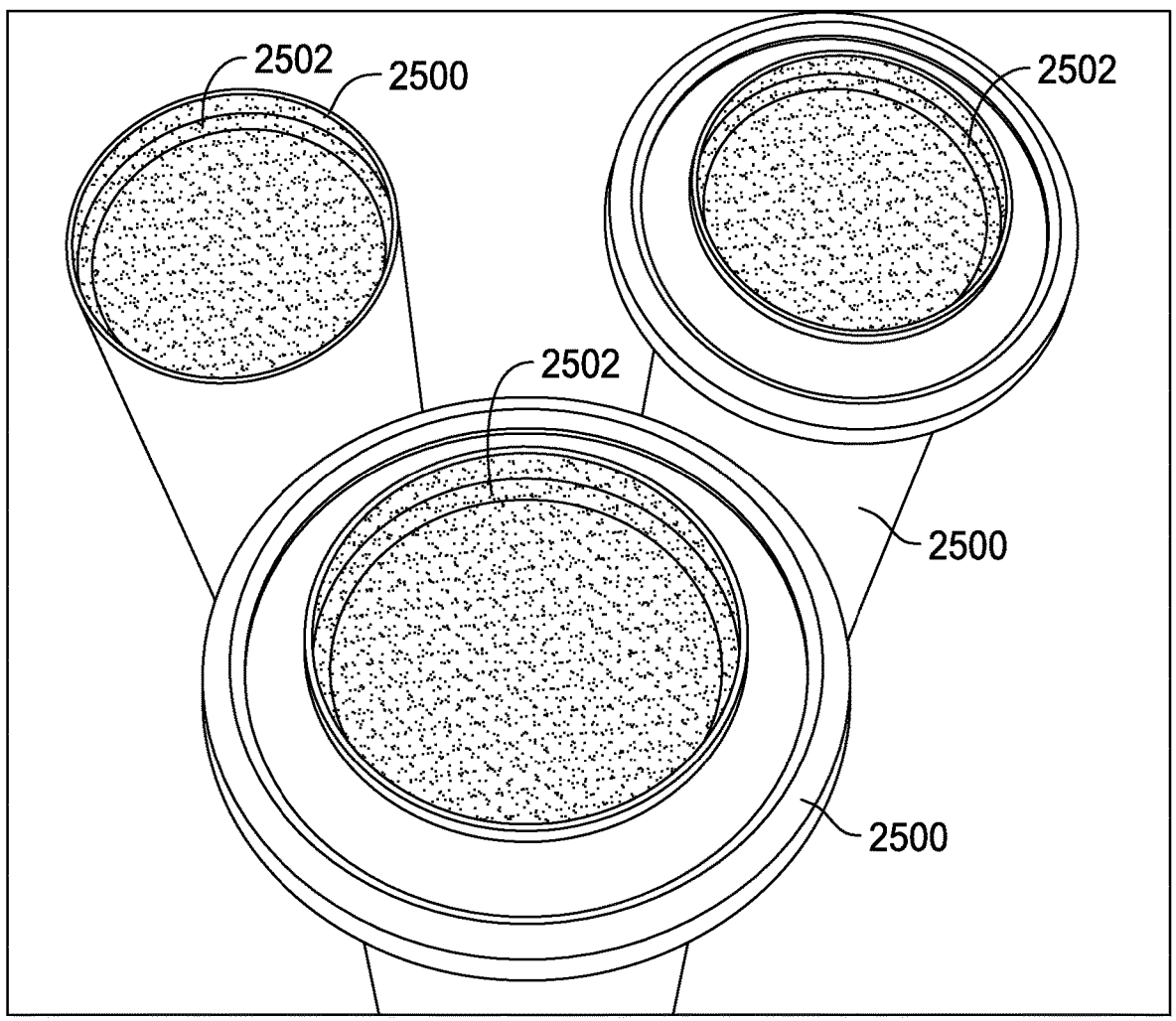
FIG. 25 illustrates corrosion formed in riser pipes due to trapped air pockets.

As explained above, this trapped air pocket serves as a reservoir of oxygen thereby increasing the likelihood of oxygen corrosion near the inlet side of the check valve. For example, FIG. 25 illustrates various different riser pipes 2500 including corrosion (generally indicated by reference number 2502) formed due to trapped air pockets. When the oxygen corrosion occurs, the pipes, fittings, couplings, etc. may become weaker. Thus, water leaks may frequently occur in pipes, fittings, couplings, etc. adjacent the check valve, the control valve, etc. on the riser. Water leaks are particularly frequent near the inlet side of the control valve.

Figure 26:
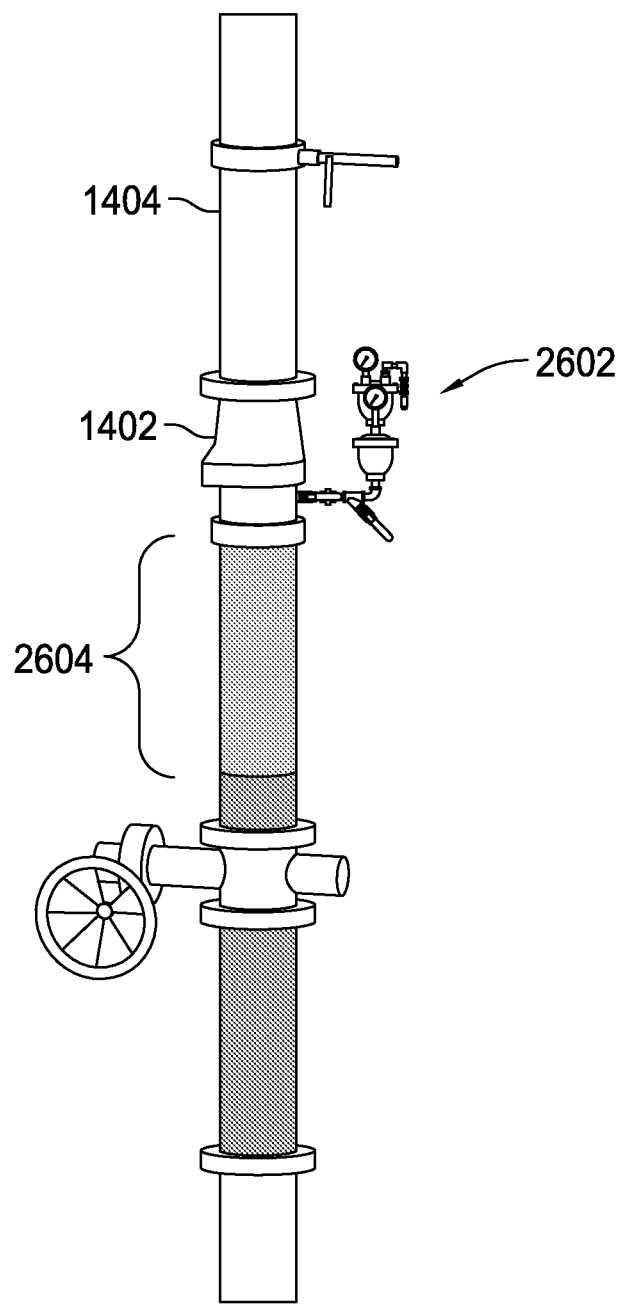
FIGS. 26 and 27 illustrate a riser having a check valve and vent according to one example embodiment.
Figure 27:
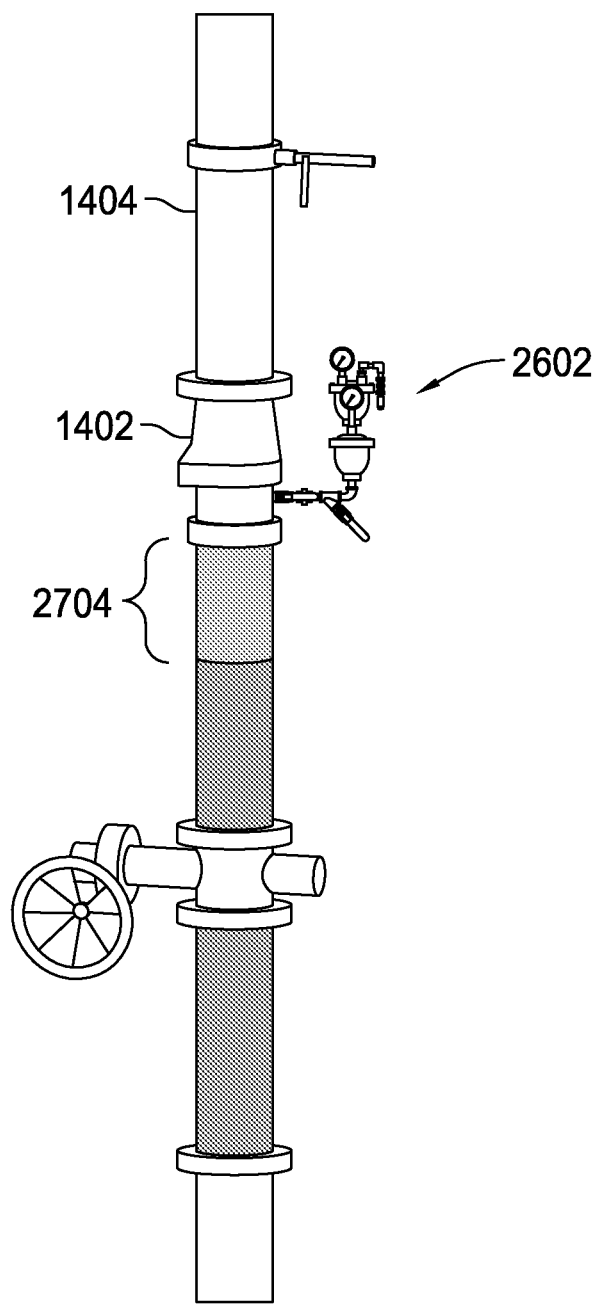

To address this issue, a vent 2602 that is configured to vent gas but not water (or another liquid) may be coupled (directly or indirectly) to the riser 1404, preferably on the inlet side of the check valve 1402 as shown in FIG. 26. As shown in FIGS. 26 and 27, the vent 2602 may be coupled to a port of the check valve 1402 on its inlet side (e.g., the port to which a pressure gauge is typically connected). Alternatively, the vent 2602 may be coupled (directly or indirectly) to the riser 1404 at another suitable location on the inlet side of the check valve 1402.

The vent 2602 will preferably automatically vent the formerly trapped air (indicated by reference numbers 2604 and 2704 in FIGS. 26 and 27, respectively) to inhibit oxygen corrosion in the riser and/or water supply line. Alternatively, the vent may be manually operated.

A wide variety of vents adapted to vent gas, but not water, may be employed, including a conventional float valve. Other examples of suitable vents include those disclosed in U.S. application Ser. No. 12/615,738 and PCT Application No. PCT/US2013/043707, the entire disclosures of which are incorporated herein by reference.

Figure 28A:
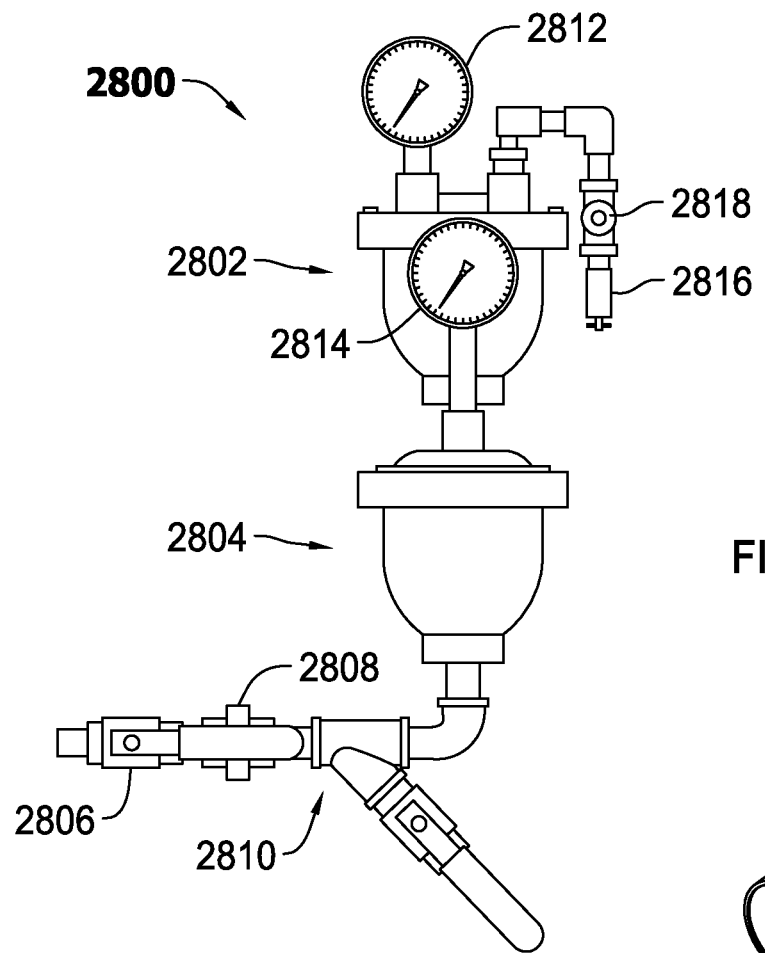
FIGS. 28A and 28B illustrate a vent assembly for venting gas but not water according to another example embodiment.
Figure 28B:
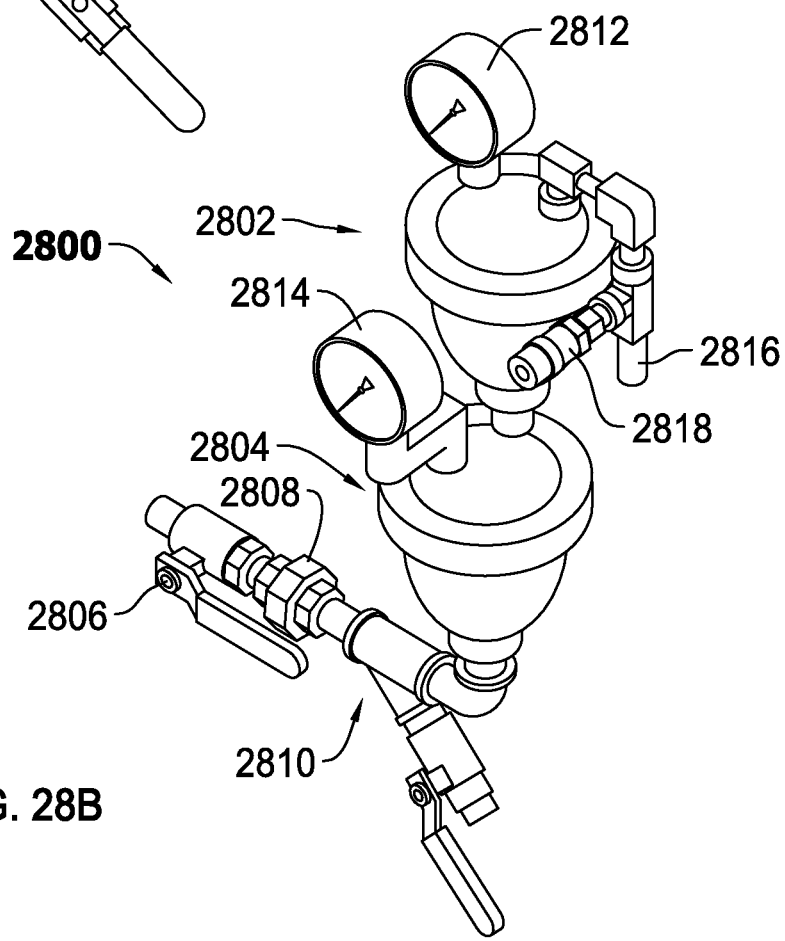

FIGS. 28A and 28B illustrate another suitable vent assembly 2800 that includes float valves 2802, 2804 coupled in series with one another. In some examples, the vent assembly may be referred to as a redundant mechanical vent assembly with stacked float valves. For example, the float valve 2802 may provide redundant protection in the event the float valve 2804 fails.

An inlet of the float valve 2804 includes a line comprising an isolation ball valve 2806, a union 2808, and a "Y" strainer 2810 having a 24 mesh screen. The isolation ball valve 2806 allows for removal of the vent assembly 2800 from an active water supply system without having to take a riser or other parts of the piping network out of service. The union 2808 allows for quick detachment of the vent assembly 2800 for repair or replacement. The "Y" strainer 2810 prevents debris (e.g., corrosion, etc.) from plugging an orifice of the float valves 2802, 2804.

The float valves 2802, 2804 are mechanical valves allowing gas but not water (or another liquid) to escape from the water supply system (e.g., a riser or another portion of the piping network) to which it is attached. In the example of FIGS. 28A and 28B, each float valve includes a float. When water enters either one of the float valves, the float of that float valve rises which may eventually cause a mechanical closure of a discharge port of the float valve. This is due to the buoyancy of the float. Thus, each float valve 2802, 2804 is configured to vent gas when the float valve is open and restrict water from escaping when the float valve is closed.

Each float valve 2802, 2804 may include a pressure gauge 2812, 2814, respectively, for displaying the water pressure at its inlet. For example, and as shown in FIGS. 28A and 28B, the pressure gauges 2812, 2814 are coupled to a port on the top of each float valve. These ports are not affected by whether its respective float valve is closed or opened. Thus, the ports are not affected by the action of the float.

Additionally, a check valve 2816 may be coupled to an outlet port of the float valve 2802. This check valve 2616 may inhibit ambient air including oxygen from entering the water supply system via the vent. The check valve 2816 may allow for nitrogen inerting (or inerting with another suitable inert gas) as explained herein.

The check valve 2816 and/or any other check valve disclosed herein (e.g., the check valve 502, 630, etc.) may include any suitable check valve including, for example, a two port valve to prevent ambient air (i.e., oxygen rich air) from entering the pipe network of a fire sprinkler system and/or to retain gas (e.g., pressurized air or purified nitrogen) in the pipe network. For example, the check valve may include a ball check valve, a pressure relief valve, an adjustable back pressure regulator, etc. The ball check valve may include a ball and a spring for biasing the ball into a closed position. The pressure relief valve may be configured to open when a back pressure (e.g., the pressure at its outlet) exceeds a set pressure limit of the pressure relief valve. For example, the pressure relief valve may be configured to open when the back pressure exceeds about 40 PSI, 50 PSI, 60 PSI, etc. The adjustable back pressure regulator may operate in a manner similar to a pressure relief valve, but has an adjustable pressure limit. In such examples, the adjustable pressure limit may include a pressure gauge (e.g., an analog or digital display) for displaying the back pressure and facilitating adjustment of the back pressure limit by a user. In some embodiments, the adjustable back pressure regulator has an adjustable pressure limit range of about zero to about 150 PSI.

Further, the vent assembly 2800 may include a gas sampling port 2818 for checking the oxygen level of gas on the outlet side of the float valve 2802. The gas sampling port 2818 may be a quick connect sample port or the like.

Figure 29:
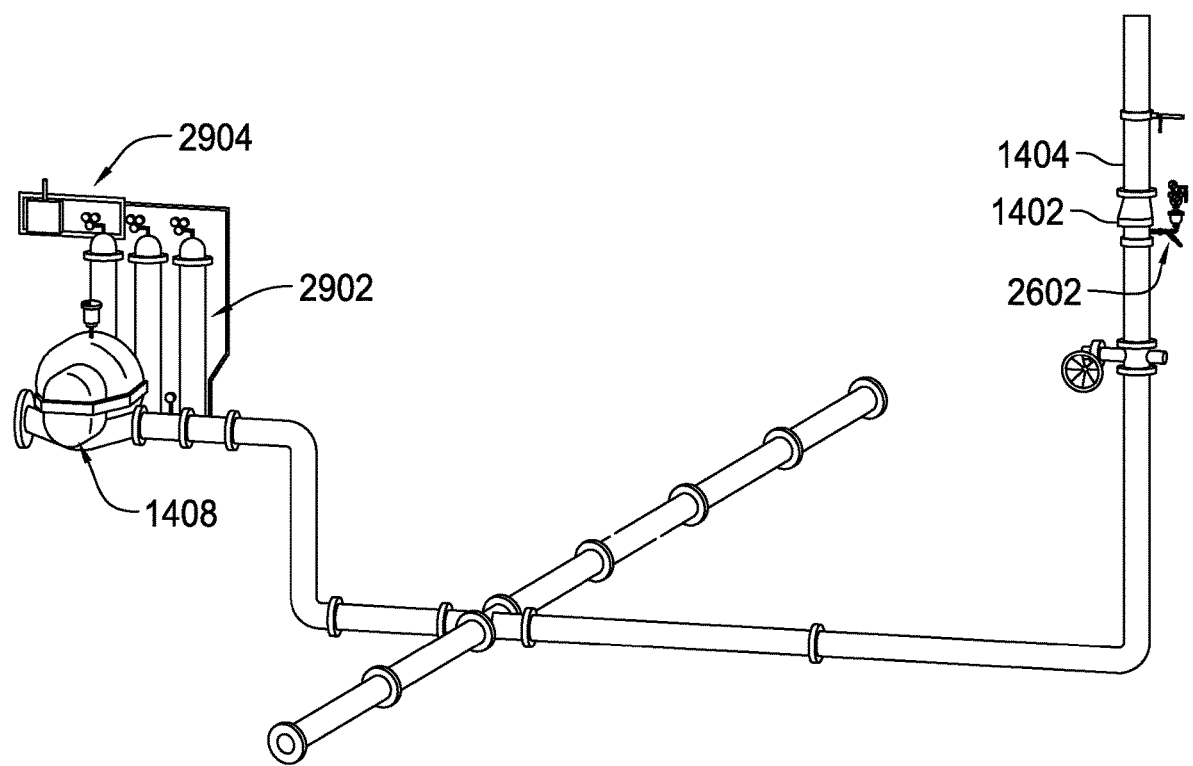
FIG. 29 illustrates a water supply system having nitrogen cylinders and a control system for supplying purified nitrogen to the piping network of the water supply system.

As shown in FIG. 29, one or more inert gas storage vessels 2902, such as nitrogen cylinders, may be employed for supplying an inert gas to the water supply line downstream of the water pump, and upstream of the check valve 1402. For this purpose, a gas injection port may be provided in the water supply line between the water pump 1408 and the check valve 1402. A control system 2904 for the gas storage vessels may also be employed. Some examples of suitable inert gas storage vessels and/or control systems are disclosed in PCT Application No. PCT/US2012/062660, the entire disclosure of which is incorporated herein by reference. Alternatively, a nitrogen generator may be used for supplying the inert gas.

The inert gas, such as purified nitrogen, is preferably injected into the water supply line at a pressure exceeding the output pressure of the water pump. In some embodiments, the pressure of the purified nitrogen supplied to the water supply line is about 100 PSIG, about 125 PSIG, about 150 PSIG, about 175 PSIG, about 200 PSIG, etc. The inert gas may be purified nitrogen, purified argon, a noble gas, etc. as explained above. The inert gas may be supplied only when the water pump is operating. Alternatively, the inert gas may be supplied continuously, periodically, randomly, etc. regardless of whether the water pump is operating.

By supplying an inert gas to the water supply line downstream of the water pump 1408, and venting trapped gas (e.g., via the vent 2602 as explained above) upstream of the check valve 1402 coupled to the riser 1404, the concentration of the inert gas in the water supply line will increase, and the concentration of oxygen in the water supply line will decrease, so as to inhibit oxygen corrosion in the water supply line.

Figure 30:
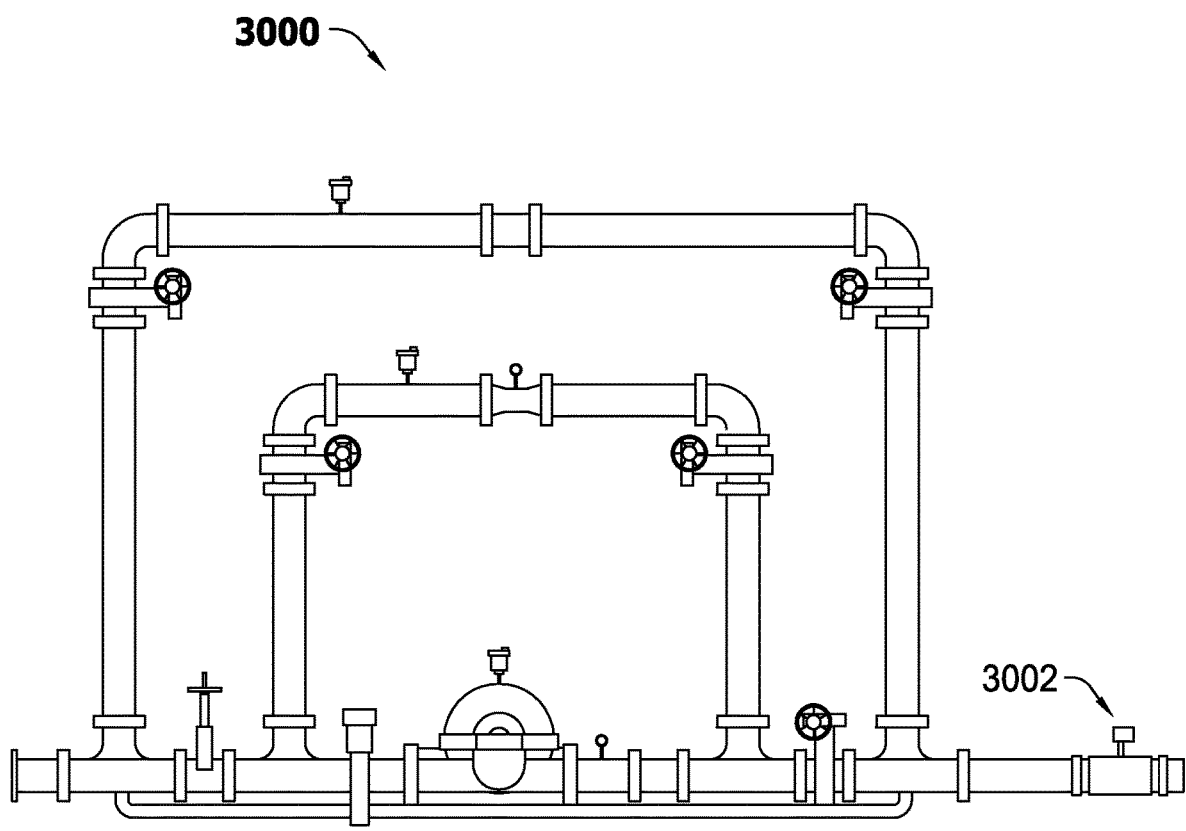
FIG. 30 illustrates the water pump assembly of FIG. 16 with a corrosion detector according to another example embodiment.
Figure 31:
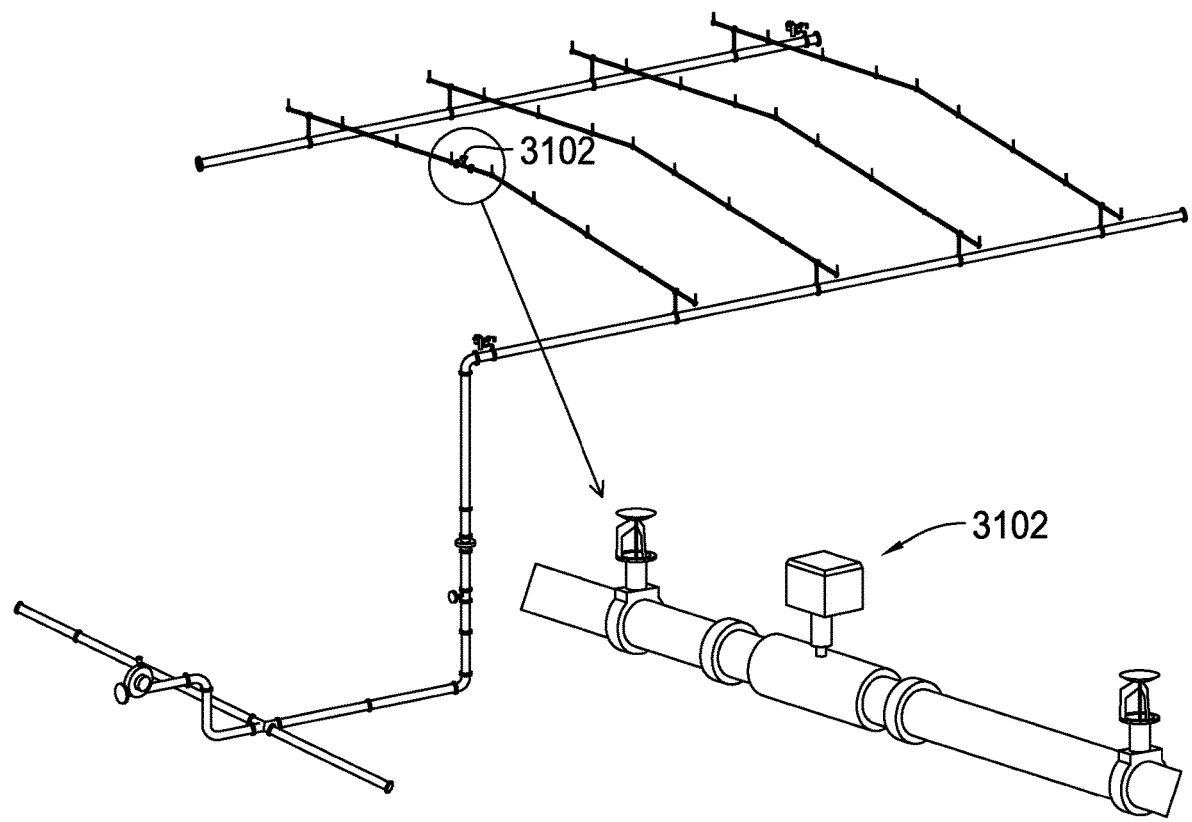
FIG. 31 illustrates a corrosion detector in a fire sprinkler zone according to another example embodiment.

As shown in FIG. 30, a corrosion detector 3002 may be coupled to the output side of a water pump assembly 3000 for monitoring corrosion activity. Some examples of suitable corrosion detectors are disclosed in PCT Application No. PCT/US2014/037144, the entire disclosure of which is incorporated herein by reference. Corrosion detectors (e.g., a corrosion detector 3102) may also be employed in the various fire sprinkler zones (i.e., downstream of the check valves on the risers), as shown in FIG. 31.

It should be understood that any of the various features disclosed herein may be employed alone or in combination. For example, a fire sprinkler system (including its water supply system) may be configured to supply inert gas to a water pump, including to a gas release valve of the water pump, and/or supply an inert gas to a piping network downstream of the water pump and upstream of a check valve or control valve coupled to a riser, and/or include a gas vent coupled to a riser upstream of a check valve or control valve coupled to the riser, and/or include a gas injection port coupled to a riser downstream of a check valve or control valve coupled to the riser, and/or include one or more gas vents coupled to the piping network downstream of check valve or control valve coupled to a riser, and/or include a corrosion detector coupled to the output of a water pump assembly, and/or include a corrosion detector coupled to the piping network downstream of a check valve or control valve coupled to a riser, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A water-based fire sprinkler system comprising:
   one or more sprinklers;
   a water pump;
   a piping network coupling the water pump to the one or more sprinklers, the piping network including a riser; and
   a vent configured to vent gas but not water, the vent coupled to the riser;
   wherein the vent includes a first vent coupled to the riser and a second vent coupled to the first vent, the first vent and the second vent each configured to vent air but not water.

2. The sprinkler system of claim 1 further comprising a check valve coupled to the riser, wherein the vent is coupled to the riser below the check valve.

3. The sprinkler system of claim 1 wherein the sprinkler system is a wet pipe system.

4. The sprinkler system of claim 1 wherein the vent includes a float valve.

5. A water-based fire sprinkler system comprising:
   one or more sprinklers;
   a water pump;

a piping network coupling the water pump to the one or more sprinklers, the piping network including a riser; and a vent configured to vent gas but not water, the vent coupled to the riser;

wherein the vent includes a check valve, the check valve inhibiting ambient air including oxygen from entering the water-based fire sprinkler system via the vent.

6. The sprinkler system of claim 5 wherein the check valve includes at least one of a ball check valve, a pressure relief valve, and an adjustable back pressure regulator.

7. The sprinkler system of claim 1 further comprising a gas injection port coupled to the riser.

8. The sprinkler system of claim 7 wherein the gas injection port is coupled to the riser above the check valve.

9. A water-based fire sprinkler system comprising:
one or more sprinklers;
a water pump;
a piping network coupling the water pump to the one or more sprinklers, the piping network including a riser; and
a vent configured to vent gas but not water, the vent coupled to the riser;
wherein the water pump includes a drain and a check valve or a water trap coupled to the drain, the check valve or the water trap inhibiting ambient air including oxygen from entering the water pump via the drain.

10. A water-based fire sprinkler system comprising:
one or more sprinklers;
a water pump;
a piping network coupling the water pump to the one or more sprinklers, the piping network including a riser; and
a vent configured to vent gas but not water, the vent coupled to the riser;
wherein the water pump has at least one ingress point at which a fluid can enter the water pump, the sprinkler system further comprising a housing surrounding the at least one ingress point and defining a space between the housing and the at least one ingress point, the housing adapted for coupling to an inert gas source for supplying an inert gas from the inert gas source to the space between the housing and the at least one ingress point.

11. The sprinkler system of claim 10 wherein the water pump includes a seal defining the at least one ingress point.

12. The sprinkler system of claim 10 wherein the water pump includes a gas release valve, the gas release valve defining the at least one ingress point.

13. The sprinkler system of claim 10 further comprising a check valve coupled to the gas release valve, the check valve inhibiting gas from entering the water pump via the gas release valve.

14. The sprinkler system of claim 10 further comprising a gas supply line coupled to the housing and an electro-mechanically operated valve for controlling a flow of inert gas through the gas supply line.

15. A water-based fire sprinkler system comprising:
one or more sprinklers;
a water pump;
a piping network coupling the water pump to the one or more sprinklers, the piping network including a riser; and
a vent configured to vent gas but not water, the vent coupled to the riser;
wherein the piping network includes at least a first pipe and a second pipe coupled to the first pipe via a pipe joint, the pipe joint defining at least one ingress point at which a fluid can enter the piping network, the sprinkler system further comprising a housing surrounding the at least one ingress point and defining a space between the housing and the at least one ingress point, the housing adapted for coupling to an inert gas source for supplying an inert gas from the inert gas source to the space between the housing and the at least one ingress point.

* * * * *